US012596499B2

(12) United States Patent
Li et al.

(10) Patent No.: US 12,596,499 B2
(45) Date of Patent: Apr. 7, 2026

(54) SYSTEM AND METHOD OF PERFORMING A READ OPERATION

(71) Applicant: Yangtze Memory Technologies Co., Ltd., Wuhan (CN)

(72) Inventors: Jianjie Li, Wuhan (CN); Wei Huang, Wuhan (CN); Weijun Wan, Wuhan (CN); Qianqian Shi, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 6 days.

(21) Appl. No.: 18/518,426

(22) Filed: Nov. 22, 2023

(65) Prior Publication Data

US 2024/0272824 A1     Aug. 15, 2024

Related U.S. Application Data

(63) Continuation of application No. PCT/CN2023/124726, filed on Oct. 16, 2023.

(30) Foreign Application Priority Data

Feb. 14, 2023     (WO) ................ PCT/CN2023/075962

(51) Int. Cl.
G11C 16/04          (2006.01)
G06F 3/06          (2006.01)

(52) U.S. Cl.
CPC .......... G06F 3/0655 (2013.01); G06F 3/0604 (2013.01); G06F 3/0679 (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 8,830,763 B2 * | 9/2014 | Seo | G11C 16/3445 |
| | | | 365/185.22 |
| 9,569,142 B2 * | 2/2017 | Han | G06F 3/0679 |
| 10,090,046 B2 | 10/2018 | Park et al. | |
| 12,061,799 B1 | 8/2024 | Duan et al. | |
| 12,417,036 B2 | 9/2025 | Duan et al. | |
| 2007/0047300 A1 | 3/2007 | Lee et al. | |
| 2013/0194872 A1 | 8/2013 | Sim et al. | |
| 2017/0133087 A1 | 5/2017 | Park et al. | |
| 2019/0096479 A1 | 3/2019 | Yu et al. | |
| 2020/0051645 A1 | 2/2020 | Choo | |
| 2020/0286545 A1 | 9/2020 | Yoon | |

(Continued)

FOREIGN PATENT DOCUMENTS

| | | |
|---|---|---|
| CN | 103247343 A | 8/2013 |
| CN | 109559776 A | 4/2019 |

(Continued)

OTHER PUBLICATIONS

International Search Report in International Appln. No. PCT/CN2023/124726, mailed on Mar. 5, 2024, 3 pages.

(Continued)

*Primary Examiner* — Pho M Luu
(74) *Attorney, Agent, or Firm* — Fish & Richardson P.C.

(57) ABSTRACT

A method for operating a memory device includes performing first sensing operations on memory cells of the memory device based on a first read voltage and a first set of develop times. The memory cells are coupled to a word line. The method further includes selecting a first read develop time from the first set of develop times based on results of the first sensing operations and performing a read operation on the memory cells based on the first read voltage and the first read develop time.

20 Claims, 15 Drawing Sheets

(56)  References Cited

U.S. PATENT DOCUMENTS

| | | |
|---|---|---|
| 2021/0005265 A1 | 1/2021 | Lee |
| 2021/0005268 A1 | 1/2021 | Kim et al. |
| 2022/0057968 A1 | 2/2022 | Kim et al. |
| 2022/0093184 A1 | 3/2022 | Kim et al. |
| 2022/0188177 A1 | 6/2022 | Lee et al. |
| 2022/0222139 A1* | 7/2022 | Shin .................... G11C 29/028 |
| 2022/0238170 A1 | 7/2022 | Kang et al. |
| 2022/0277801 A1 | 9/2022 | Park et al. |
| 2022/0300200 A1 | 9/2022 | Yeh et al. |
| 2023/0019716 A1 | 1/2023 | Kwak |
| 2023/0251781 A1 | 8/2023 | Son et al. |
| 2024/0028218 A1 | 1/2024 | Jeong et al. |
| 2024/0078038 A1 | 3/2024 | Li |

FOREIGN PATENT DOCUMENTS

| | | | |
|---|---|---|---|
| CN | 109559777 A | 4/2019 | |
| CN | 110942796 A | 3/2020 | |
| TW | 202141482 A | 11/2021 | |

OTHER PUBLICATIONS

Written Opinion in International Appln. No. PCT/CN2023/124726, mailed on Mar. 5, 2024, 6 pages.

Communication Pursuant to Article 94(3) EPC in European Appln. No. 23817010.4, mailed on Jul. 8, 2025, 6 pages.

International Search Report and Written Opinion in International Appln. No. PCT/CN2023/075962, mailed on Jul. 18, 2023, 10 pages.

Notice of Allowance in Chinese Appln. No. 202380008341.0, mailed on Aug. 28, 2025, 6 pages (with machine translation).

Notice of Allowance in Taiwanese Appln. No. 112124820, mailed on Dec. 6, 2024, 9 pages (with machine translation).

Office Action in Korean Appln. No. 10-2024-7028737, mailed on Oct. 31, 2025, 15 pages (with machine translation).

Communication pursuant to Article 94(3) EPC in European Appln. No. 23817010.4, mailed on Jan. 29, 2026, 6 pages.

* cited by examiner

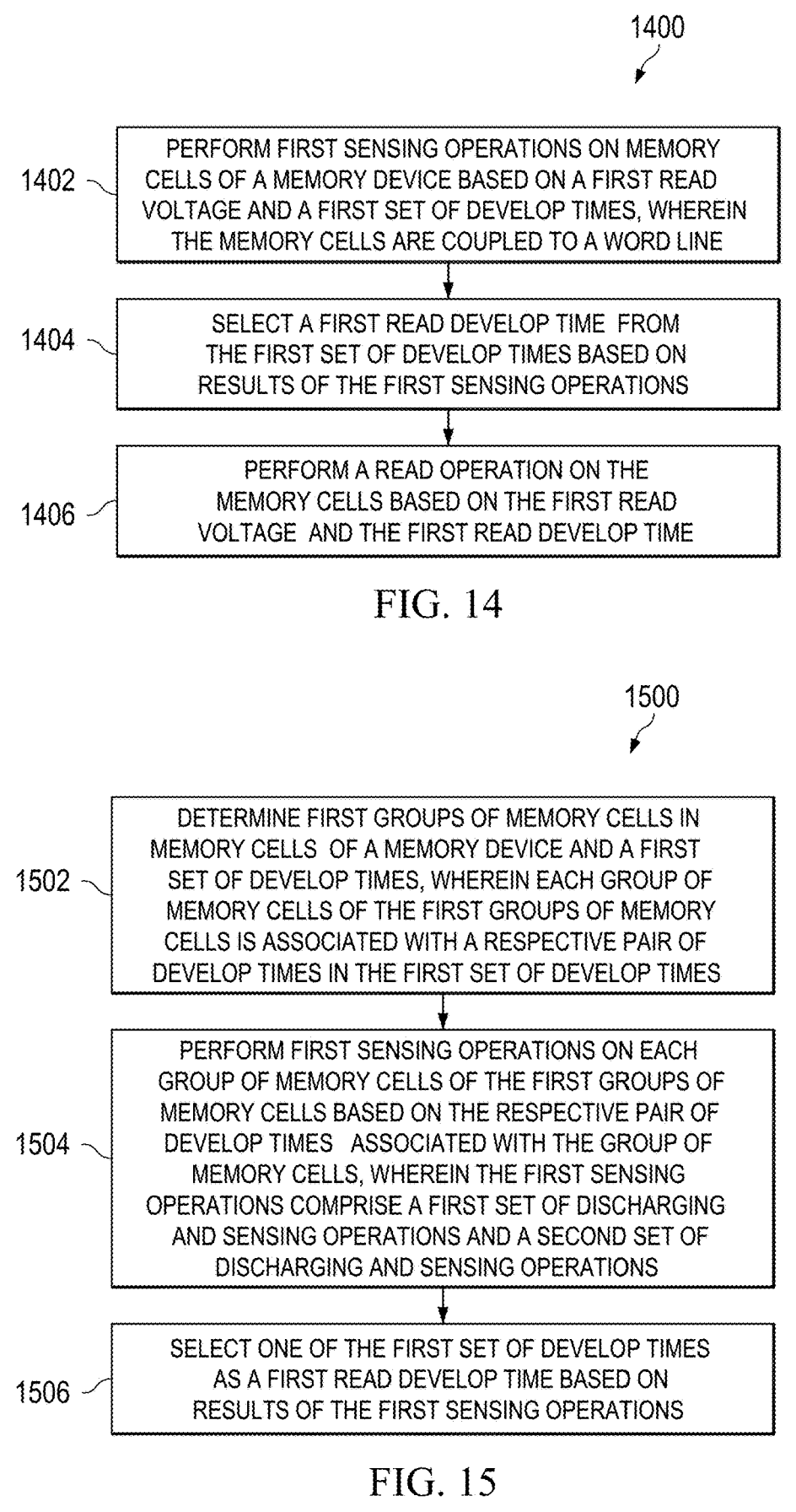

1400

1402 — PERFORM FIRST SENSING OPERATIONS ON MEMORY CELLS OF A MEMORY DEVICE BASED ON A FIRST READ VOLTAGE AND A FIRST SET OF DEVELOP TIMES, WHEREIN THE MEMORY CELLS ARE COUPLED TO A WORD LINE

1404 — SELECT A FIRST READ DEVELOP TIME FROM THE FIRST SET OF DEVELOP TIMES BASED ON RESULTS OF THE FIRST SENSING OPERATIONS

1406 — PERFORM A READ OPERATION ON THE MEMORY CELLS BASED ON THE FIRST READ VOLTAGE AND THE FIRST READ DEVELOP TIME

1502 — DETERMINE FIRST GROUPS OF MEMORY CELLS IN MEMORY CELLS OF A MEMORY DEVICE AND A FIRST SET OF DEVELOP TIMES, WHEREIN EACH GROUP OF MEMORY CELLS OF THE FIRST GROUPS OF MEMORY CELLS IS ASSOCIATED WITH A RESPECTIVE PAIR OF DEVELOP TIMES IN THE FIRST SET OF DEVELOP TIMES

1504 — PERFORM FIRST SENSING OPERATIONS ON EACH GROUP OF MEMORY CELLS OF THE FIRST GROUPS OF MEMORY CELLS BASED ON THE RESPECTIVE PAIR OF DEVELOP TIMES ASSOCIATED WITH THE GROUP OF MEMORY CELLS, WHEREIN THE FIRST SENSING OPERATIONS COMPRISE A FIRST SET OF DISCHARGING AND SENSING OPERATIONS AND A SECOND SET OF DISCHARGING AND SENSING OPERATIONS

1506 — SELECT ONE OF THE FIRST SET OF DEVELOP TIMES AS A FIRST READ DEVELOP TIME BASED ON RESULTS OF THE FIRST SENSING OPERATIONS

FIG. 15

SYSTEM AND METHOD OF PERFORMING A READ OPERATION

CROSS-REFERENCE TO RELATED APPLICATIONS

This application is a continuation of International Application No. PCT/CN2023/124726, filed on Oct. 16, 2023, which claims priority to International Patent Application No. PCT/CN2023/075962, filed on Feb. 14, 2023. The disclosures of the aforementioned applications are hereby incorporated by reference in their entireties.

TECHNICAL FIELD

This description generally relates to the field of semiconductor technology, and more particularly, to a system and method for performing a read operation in a non-volatile memory.

BACKGROUND

As memory devices are shrinking to smaller die size, manufacturing cost reduces and storage density increases over time. However, scaling of planar memory cells faces challenges due to process technology limitations and reliability issues. For example, a three-dimensional (3D) memory architecture can address the density and performance limitation in planar memory cells.

In a NAND flash memory, many layers of memory cells can be stacked vertically such that storage density per unit area can be increased. The vertically stacked memory cells can form memory strings, where the channels of the memory cells are connected in each memory string. Each memory cell can be addressed through a word line and a bit line. Data (i.e., logic states) of the memory cells in an entire memory page sharing the same word line can be read or programmed simultaneously. However, reliability can be a concern for a NAND flash memory when aggressive scaling is performed.

SUMMARY

The present disclosure relates to methods and devices for performing a read operation in a memory. In one example, a method for operating a memory device includes performing first sensing operations on memory cells of the memory device based on a first read voltage and a first set of develop times. The memory cells are coupled to a word line. The method further includes selecting a first read develop time from the first set of develop times based on results of the first sensing operations and performing a read operation on the memory cells based on the first read voltage and the first read develop time.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

FIG. 14 illustrates an example method for operating a memory device, according to some aspects of the present disclosure.

FIG. 15 illustrates another example method for operating a memory device, according to some aspects of the present disclosure.

Like reference numbers and designations in the various drawings indicate like elements.

DETAILED DESCRIPTION

Figure 1:
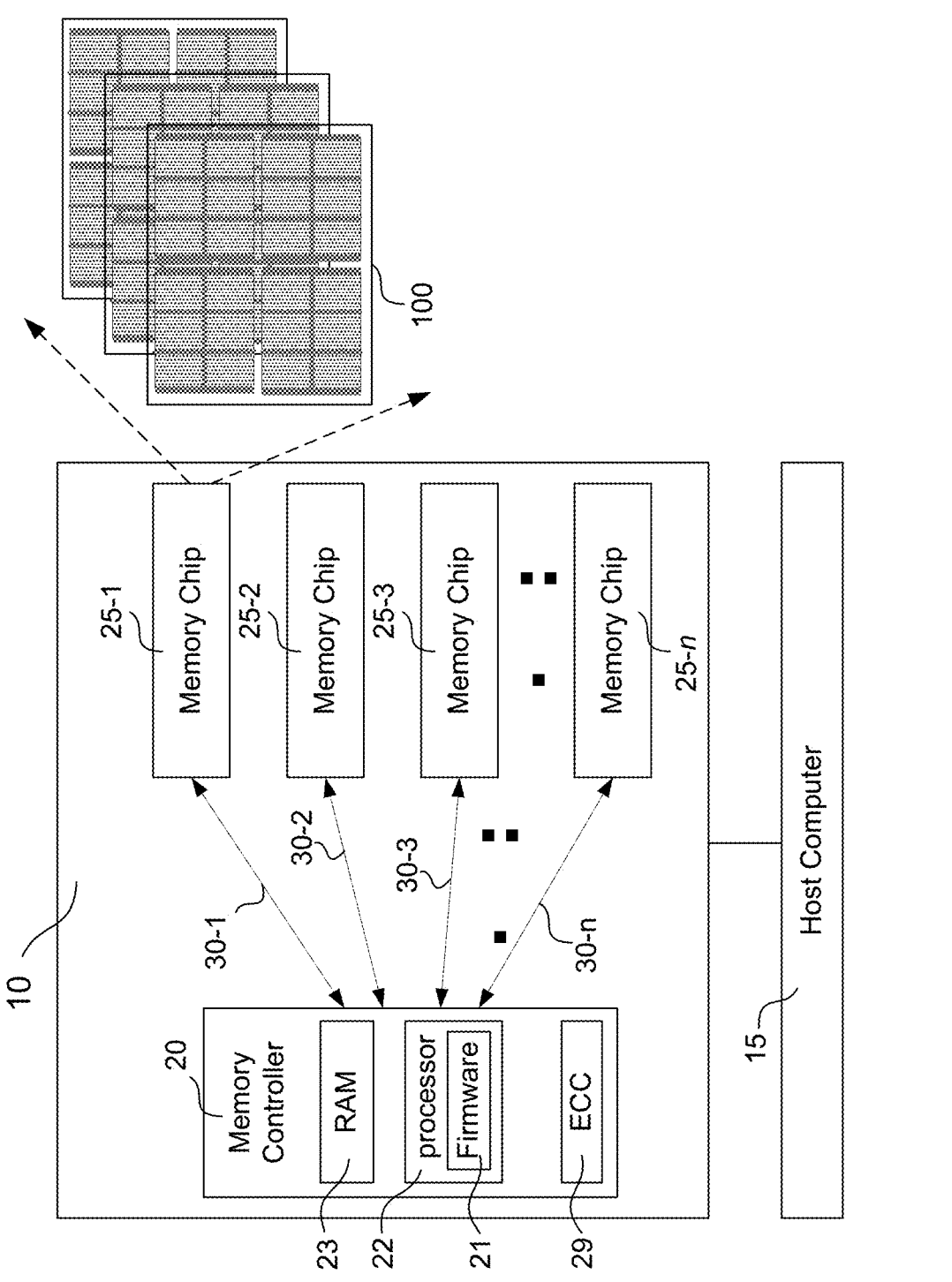
FIGS. 1, 2, and 3 illustrate a storage system with one or more memory chips, according to some aspects of the present disclosure.

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one implementation," "an implementation," "an example implementation," "some implementation," etc., indicate that the implementation described can include a particular feature, structure, or characteristic, but every implementation may not necessarily include the particular feature, structure, or characteristic. Moreover, such phrases do not necessarily refer to the same implementation. Further, when a particular feature, structure or characteristic is described in connection with an implementation, it would be within the knowledge of a person skilled in the pertinent art to affect such feature, structure, or characteristic in connection with other implementations whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context.

As used herein, the term "substrate" refers to a material onto which subsequent material layers are added. The substrate includes a "top" surface and a "bottom" surface. The top surface of the substrate is typically where a semiconductor device is formed, and therefore the semiconductor device is formed at a top side of the substrate unless stated otherwise. The bottom surface is opposite to the top surface and therefore a bottom side of the substrate is opposite to the top side of the substrate. The substrate itself can be patterned. Materials added on top of the substrate can be patterned or can remain unpatterned. Furthermore, the substrate can include a wide array of semiconductor materials, such as silicon, germanium, gallium arsenide, indium phosphide, etc. Alternatively, the substrate can be made from an electrically non-conductive material, such as a glass, a plastic, or a sapphire wafer.

As used herein, the term "layer" refers to a material portion including a region with a thickness. A layer has a top side and a bottom side where the bottom side of the layer is relatively close to the substrate and the top side is relatively away from the substrate. A layer can extend over the entirety of an underlying or overlying structure, or can have an extent less than the extent of an underlying or overlying structure. Further, a layer can be a region of a homogeneous or inhomogeneous continuous structure that has a thickness less than the thickness of the continuous structure. For example, a layer can be located between any set of horizontal planes between, or at, a top surface and a bottom surface of the continuous structure. A layer can extend horizontally, vertically, and/or along a tapered surface. A substrate can be a layer, can include one or more layers therein, and/or can have one or more layer thereupon, there above, and/or there below. A layer can include multiple layers. For example, an interconnect layer can include one or more conductive and contact layers (in which contacts, interconnect lines, and/or vertical interconnect accesses (VIAs) are formed) and one or more dielectric layers.

As used herein, the term "nominal/nominally" refers to a desired, or target, value of a characteristic or parameter for a component or a process step, set during the design phase of a product or a process, together with a range of values above and/or below the desired value. The range of values can be due to slight variations in manufacturing processes or tolerances. As used herein, the terms "about" or "approximately" indicate the value of a given quantity that can vary based on a particular technology node associated with the subject semiconductor device. Based on the particular technology node, the terms "about" or "approximately" can indicate a value of a given quantity that varies within, for example, 10-30% of the value (e.g., ±10%, ±20%, or ±30% of the value).

Currently, in memory devices, especially in high density memory devices, threshold voltage (Vt) distribution shift can be impacted by many factors, such as programmed cells charge loss with over time, noises, long NAND's service lift, etc., thus is a common and critical problem. After Vt distribution shift, the pre-defined read level cannot track Vt distribution, thereby causing read fails. A system and method for performing a read operation in a NAND memory, to track Vt distribution is needed.

FIG. 1 illustrates a block diagram of an electronic device S1 having a storage system 10, according to some implementations. In some implementations, the electronic device S1 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. Storage system 10 (e.g., a NAND storage system) can include a memory controller 20 and one or more semiconductor memory devices 25-1, 25-2, 25-3, . . . , 25-n. Each semiconductor memory device 25 (hereafter just "memory device") can be a NAND device (e.g., "flash," "NAND flash" or "NAND"). Storage system 10 can communicate with a host 15 through memory controller 20, where memory controller 20 can be connected to one or more memory chips 25-1, 25-2, 25-3, . . . , 25-n, via one or more memory channels 30-1, 30-2, 30-3, . . . , 30-n. In some implementations, each memory device 25 can be managed by memory controller 20 via one or more memory channels 30-1, 30-2, 30-3, . . . , 30-n.

In some implementations, host 15 can include a processor of an electronic device, such as a central processing unit (CPU), or a system-on-chip (SoC), such as an application processor (AP). Host 15 can send data to be stored at storage system 10 and/or can retrieve data from stored in storage system 10.

In some implementations, memory controller 20 can handle I/O requests received from host 15, ensure data integrity and efficient storage, and manage memory device 25. To perform these tasks, memory controller 20 can run firmware 21, which can be executed by one or more processors 22 (e.g., micro-controller units, CPU) of memory controller 20. For example, memory controller 20 can run firmware 21 to map logical addresses (e.g., address utilized by the host associated with host data) to physical addresses in memory device 25 (e.g., actual locations where the data is stored). Memory controller 20 also runs firmware 21 to manage defective memory blocks in the memory device 25, where the firmware 21 can remap the logical address to a different physical address, i.e., move the data to a different physical address. Memory controller 20 can also include one or more memories 23 (e.g., DRAM, SRAM, EPROM, etc.), which can be used to store various metadata used by the firmware 21. In some implementations, the memory controller 20 can also perform error recovery through an error correction code (ECC) engine 29. ECC is used to detect and correct the raw bit errors that occur within each memory device 25.

In some implementations, the memory channels 30 can provide data and control communication between the memory controller 20 and each memory device 25 via a data bus. The memory controller 20 can select one of the memory device 25 according to a chip enable signal.

In some implementations, each memory device 25 in FIG. 1 can include one or more memory devices 100, where each memory device can be a NAND memory.

Figure 3:
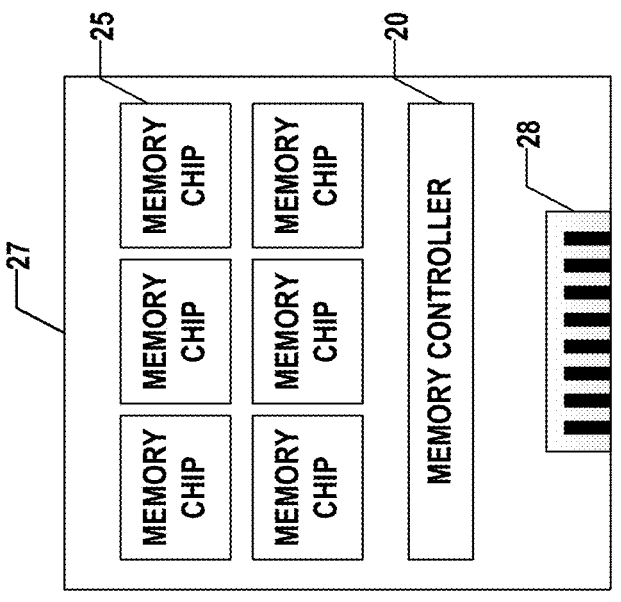
Figure 2:
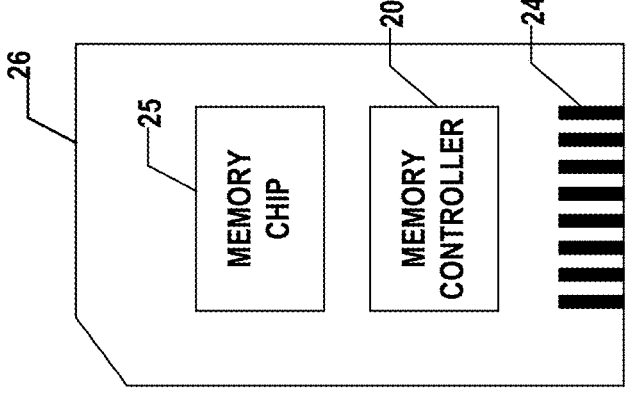

In some implementations, memory controller 20 and one or more memory device 25 can be integrated into various types of storage devices, for example, be included in the same package, such as a universal Flash storage (UFS) package or an eMMC package. That is, storage system 10 can be implemented and packaged into different types of end electronic products. In one example as shown in FIG. 2, memory controller 20 and a single memory device 25 can be integrated into a memory card 26. Memory card 26 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 26 can further include a memory card connector 24 coupling memory card 26 with a host (e.g., the host 15 in FIG. 1). In another example as shown in FIG. 3, memory controller 20 and multiple memory devices 25 can be integrated into a solid state drive (SSD) 27. SSD 27 can further include a SSD connector 28 coupling SSD 27 with a host (e.g., the host 15 in FIG. 1).

Figure 4:
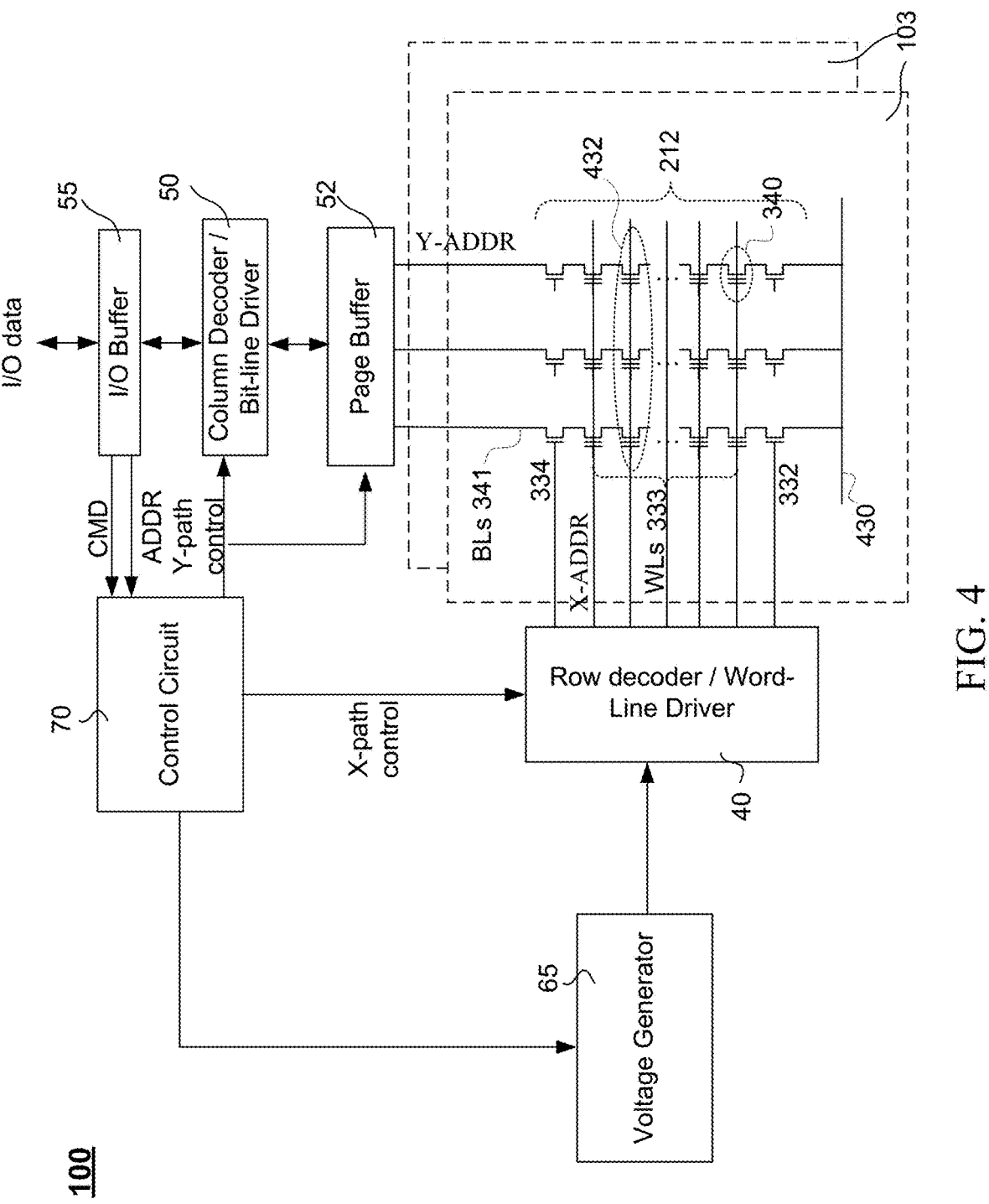
FIG. 4 illustrates a schematic of a memory device, according to some aspects of the present disclosure.

FIG. 4 illustrates a schematic diagram of the memory device 100, according to some implementations. In some implementations, memory device 100 can include one or more memory blocks 103 (e.g., 103-1, 103-2, 103-3). Each memory block 103 can include a plurality of memory strings 212. Each memory string 212 includes a plurality of memory cells 340. Memory cells 340 sharing the same word line forms one or more memory pages 432. Memory string 212 can also include at least one field effect transistor (e.g., MOSFET) at each end, which is controlled by a lower select gate ("LSG") 332 and a top select gate ("TSG") 334, respectively. Lower select gates ("LSGs") can also be referred to as bottom select gates ("BSGs"). The drain terminal of the top select transistor 334-T can be connected to a bit line 341, and the source terminal of the lower select transistor 332-T can be connected to an array common source ("ACS") 430. ACS 430 can be shared by the memory strings 212 in an entire memory block, and is also referred to as the common source line.

In some implementations, memory device 100 can also include a periphery circuit that can include many digital, analog, and/or mixed-signal circuits to support functions of the memory block 103, for example, a page buffer 52, a row decoder/word line driver 40, a column decoder/bit line driver 50, a controller 70, a voltage generator 65 and an input/output buffer 55. Controller 70 can include one or more control circuits. In some aspects, controller 70 can include one or more registers, buffers, and/or memories to store one or more trim settings as described in the present disclosure. These circuits can include active and/or passive semiconductor devices, such as transistors, diodes, capacitors, resistors, etc., as would be apparent to a person of ordinary skill in the art.

In some implementations, memory blocks 103 can be coupled with the row decoder/word line driver 40 via word lines ("WLs") 333, lower select gates ("LSGs") 332 and top select gates ("TSGs") 334. Memory blocks 103 can be coupled with page buffer 52 via bit lines ("BLs") 341. Row decoder/word line driver 40 can select one of the memory blocks 103 on the memory device 100 in response to an X-path control signal provided by the controller 70. Row decoder/word line driver 40 can transfer voltages provided from the voltage generator 65 to the word lines according to the X-path control signal. During the read and program operation, the row decoder/word line driver 40 can transfer a read voltage $V_{read}$ and a program voltage $V_{pgm}$ to a selected word line and a pass voltage $V_{pass}$ to an unselected word line according to the X-path control signal received from the controller 70.

In some implementations, column decoder/bit line driver 50 can transfer an inhibit voltage $V_{inhibit}$ to an unselected bit line and connect a selected bit line to ground according to a Y-path control signal received from controller 70. In the other words, column decoder/bit line driver 50 can be configured to select or unselect one or more memory strings 212 according to the Y-path control signal from controller 70. The page buffer 52 can be configured to read and program (write) data from and to the memory block 103 according to the control signal Y-path control from the controller 70. For example, the page buffer 52 can store one page of data to be programmed into one memory page 432. In another example, page buffer 52 can perform verify operations to ensure that the data has been properly programmed into each memory cell 340. In yet another example, during a read operation, page buffer 52 can sense current flowing through the bit line 341 that reflects the logic state (i.e., data) of the memory cell 340 and amplify small signal to a measurable magnification.

In some implementations, in order to increase the efficiency of a write operation, column decoder/bit line driver 50 can transfer a bias voltage $V_{bias}$ to a selected bit line according to a Y-path control signal from controller 70 and the data to be programmed from page buffer 52.

In some implementations, input/output buffer 55 can transfer the I/O data from/to the page buffer 52 as well as addresses ADDR or commands CMD to the controller 70. In some implementations, input/output buffer 55 can function as an interface between memory controller 20 (in FIG. 1) and memory device 100 on memory device 25.

In some implementations, controller 70 can control page buffer 52 and row decoder/word line driver 40 in response to the commands CMD transferred by the input/output buffer 55. During the program operation, controller 70 can control row decoder/word line driver 40 and page buffer 52 to program a selected memory cell. During the read operation, controller 70 can control row decoder/word line driver 40 and the page buffer 52 to read a selected memory cell. The X-path control signal and the Y-path control signal include a row address X-ADDR and a column address Y-ADDR that can be used to locate the selected memory cell in the memory block 103. The row address X-ADDR can include a page index PD and a block index BD to identify memory page 432 and memory block 103, respectively. The column address Y-ADDR can identify a byte or a word in the data of the memory page 432.

In some implementations, voltage generator 65 can generate voltages to be supplied to word lines and bit lines under the control of controller 70. The voltages generated by voltage generator 65 include the read voltage $V_{read}$, the program voltage $V_{pgm}$, the pass voltage $V_{pass}$, the inhibit voltage $V_{inhibit}$, the bit line bias voltage $V_{bias}$, etc.

It is noted that the arrangement of the electronic components in the storage system 10 and the memory device 100 in FIGS. 1, 2A-2B, and 3-4 are shown as non-limiting examples. In some implementations, storage system 10 and memory device 100 can have other layout and can include additional components. Components (e.g., controller 70, I/O buffer 55) on memory device 100 shown in FIG. 4 can also be moved off memory device 100, as a stand-alone electric component in the storage system 10. Components (e.g., controller 70, I/O buffer 55) on memory device 100 shown in FIG. 4 can also be moved to other components in storage system 10, for example, a portion of controller 70 can be combined with memory controller 20 and vice versa.

Figure 5:
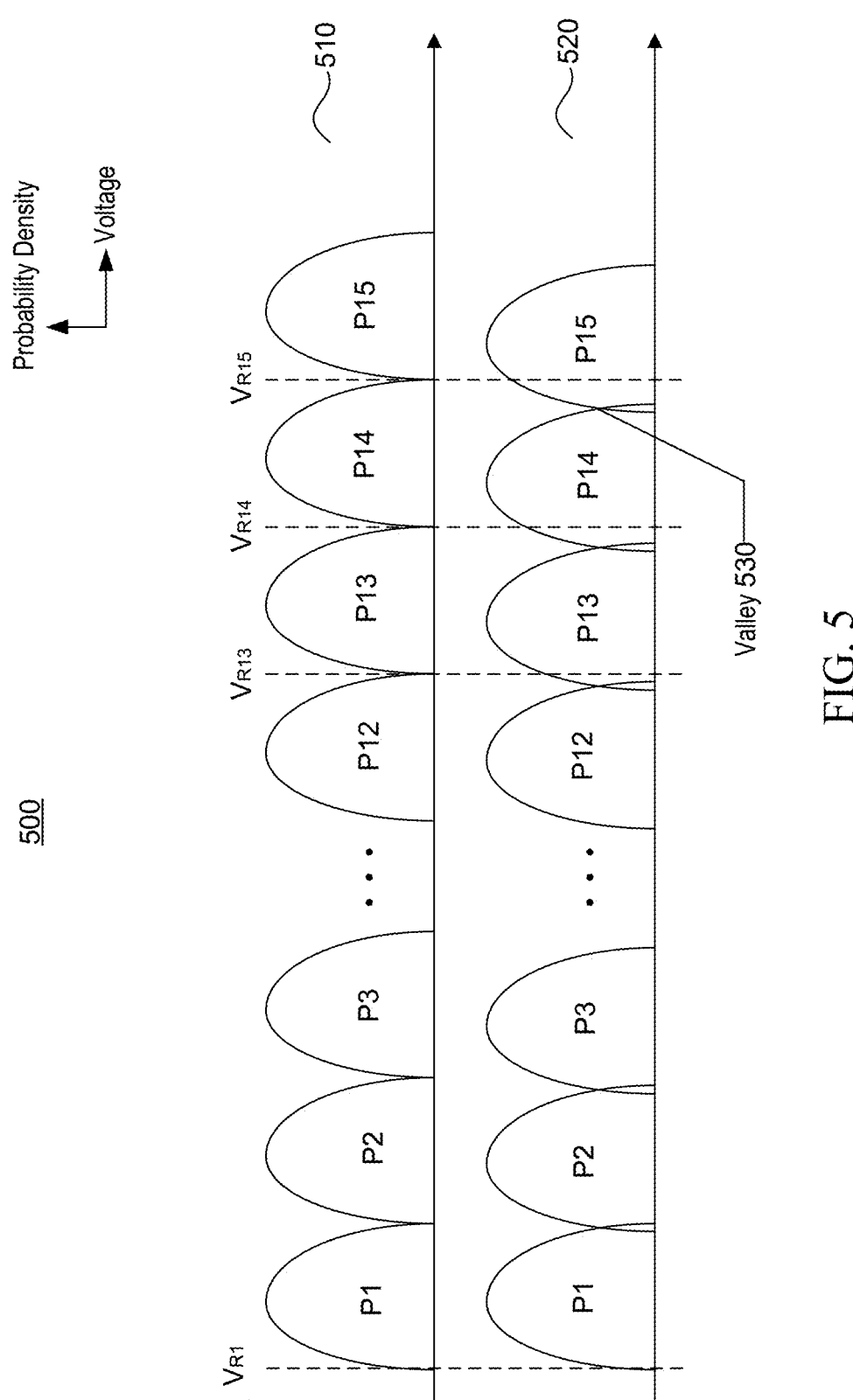
FIG. 5 illustrates a schematic diagram of an exemplary threshold voltage distribution of a memory device, according to some aspects of the present disclosure.

FIG. 5 illustrates a schematic diagram of an exemplary threshold voltage distribution of a memory device, according to some implementations.

Referring back to FIG. 4, in some implementations, memory block 103 can be formed based on floating gate technology. In some implementations, the memory block 103 can be formed based on charge trapping technology. The NAND flash memory based on charge trapping can provide high storage density and high intrinsic reliability. Storage data in the form of logic states ("states," e.g., threshold voltages Vth of the memory cell 340) depends on the number of charge carriers trapped in the memory film of the memory cell 340.

In some implementations, in a NAND flash memory, a read operation and a write operation (also referred to as program operation) can be performed for the memory page 432, and an erase operation can be performed for the memory block 103.

In some implementations, in a NAND memory, the memory cell 340 can be in an erased state ER or a programmed state P1. Initially, memory cell 340 in memory block 103 can be reset to the erased state ER as logic "1" by implementing a negative voltage difference between control gates 333 and channel such that trapped charge carriers in the memory film of memory cells 340 can be removed. For example, the negative voltage difference can be induced by setting control gates 333 of memory cells 340 to ground, and applying a high positive voltage (an erase voltage Verase) to ACS 430. At the erased state ER ("state ER"), the threshold voltage Vth of memory cells 340 can be reset to the lowest value.

In some implementations, during programming (i.e., writing), a positive voltage difference between control gates 333 and channel can be established by, for example, applying a program voltage Vpgm (e.g., a positive voltage pulse between 10 V and 20 V) on control gate 333, and grounding the corresponding bit line 341. As a result, charge carriers (e.g., electrons) can be injected into the memory film of memory cell 340, thereby increasing the threshold voltage Vth of memory cell 340. Accordingly, memory cell 340 can be programmed to the programmed state P1 ("state P1" or logic "0").

In some implementations, the state of the memory cell (e.g., state ER or state P1) can be determined by measuring or sensing the threshold voltage Vth of the memory cell. During a read operation, a read voltage Vread can be applied on control gate 333 of the memory cell and current flowing through the memory cell can be measured at bit line 341. A pass voltage Vpass can be applied on unselected word lines to switch on unselected memory cells.

In some implementations, a NAND flash memory can be configured to operate in a single-level cell (SLC) mode. To increase storage capacity, a NAND flash memory can also be configured to operate in a multi-level cell (MLC) mode, a triple-level cell (TLC) mode, a quad-level cell (QLC) mode, or a combination of any of these modes. In the SLC mode, a memory cell stores 1 bit and has two logic states, logic {1 and 0}, i.e., states ER and S1. In the MLC mode, a memory cell stores 2 bits, and has four logic states, logic {11, 10, 01, and 00}, i.e., states ER, M1, M2, and M3. In the TLC mode, a memory cell stores 3 bits, and has eight logic states, logic {111, 110, 101, 100, 011, 010, 001, 000}, i.e., states ER, and states T1-T7. In the QLC mode, a memory cell stores 4 bits and has 16 logic states, logic {1111, 1110, 1101, 1100, 1011, 1010, 1001, 1000, 0111, 0110, 0101, 0100, 0011, 0010, 0001, 0000}, i.e., states ER, and states Q1-Q15. Memory controller 20 of storage system 10 (see FIG. 1) can convert data received from host 15 into corresponding logic states of the memory cells on memory devices 100 and vice versa.

In some aspect of the QLC mode, states P1-P15 corresponds to states Q1-Q15. In some aspects, each state of the memory cells can correspond to a specific range of threshold voltage $V_{th}$, where the threshold voltage $V_{th}$ distribution of each state can be represented by a probability density. In some aspects, the states other than the erased state ER can be programmed by using an incremental step pulse programming (ISPP) scheme where the programming voltage $V_{pgm}$ can be incrementally increased by adding a step pulse $V_{step}$. For example, the QLC states can be programmed from state ER with a lower threshold voltage to state Q15 with a highest threshold voltage.

In some aspects, after programming, states P1-P15 can be verified by using one or more pre-defined read reference voltages, during a verification process. By applying one or more of the pre-defined read reference voltages to the control gate of a target memory cell, the range of the memory cell's threshold voltage $V_{th}$ can be determined.

For example, to verify if a memory cell is at state ER, the read reference voltage $V_{R1}$ can be used. If the target memory cell is at state ER, the threshold voltage $V_{th}$ of the target memory cell is lower than the read reference voltage $V_{R1}$. The target memory cell can be switch on and form a conductive path in the channel. If the target memory cell is at any one of the states P1-P15, the threshold voltage $V_{th}$ of the target memory cell is higher than the pre-defined read reference voltage $V_{R1}$. The target memory cell is thereby switched off. By measuring or sensing the current through the target memory cell at the corresponding bit line, via the page buffer 52, the threshold voltage $V_{th}$ or the state of the target memory cell can be verified.

In some aspects, as shown in diagram 510, to determine the states ER and P1-P15 for the QLC mode, the pre-defined read reference voltages, for example, including, $V_{R1}$, $V_{R13}$, $V_{R14}$ and $V_{R15}$, can be used. For example, in the QLC mode, the threshold voltage of state ER is below $V_{R1}$, and the threshold voltage of state P15 is above $V_{R15}$, where the threshold voltages of state P14 is between $V_{R14}$ and $V_{R15}$ and the threshold voltages of state P13 is between $V_{R13}$ and $V_{R14}$.

In some aspects, as shown in diagram 520, the threshold voltage $V_{th}$ distribution of each state of P1-P15 may shift over time. As shown in diagram 520, the change of a threshold voltage distribution of memory cells may be differently illustrated according to a programmed state. For example, in the case of a lower program state P1, P2 and P3 a distribution may tend to shift to the slight right side. Moreover, in the case of upper program states P12, P13, P14 and P15, the distribution may tend to spread in the slight left side. By applying one or more of the pre-defined read reference voltages, including for example, $V_{R1}$, $V_{R13}$, $V_{R14}$ and $V_{R15}$, to the control gate of the target memory cell, the range of the memory cell's threshold voltage Vth may not be determined appropriately. In some aspects, a valley may include an intersection between a first threshold voltage distribution of a first state and a second threshold voltage distribution of a second state. The second state may include an adjacent or a neighboring state of the first state. For example, valley 530 may include an intersection between a threshold voltage distribution of a program state P14 and a threshold voltage distribution of a program state P15.

In memory devices, especially in high density memory devices, threshold voltage (Vt) distribution shift can be impacted by many factors, such as programmed cells charge loss with over time, noises, long NAND's service lift, etc., thus is a common and critical problem. After Vt distribution shift, the pre-defined read level cannot track Vt distribution, thereby causing read fails.

Figure 6A:
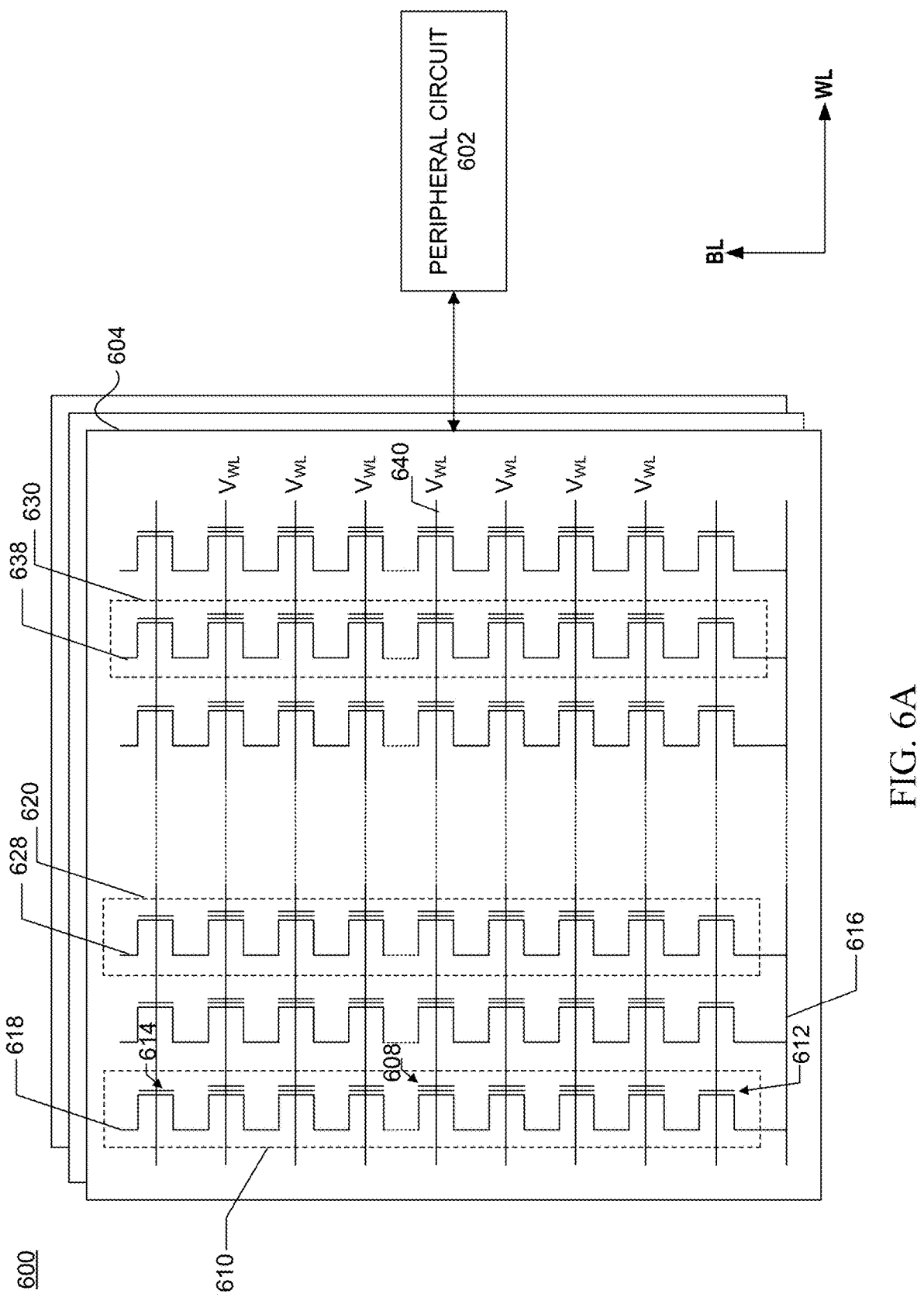
FIG. 6A illustrates an example schematic circuit diagram of a memory device, according to some aspects of the present disclosure.

FIG. 6A illustrates an example schematic circuit diagram 600 of a memory device, according to aspects of the present disclosure. The example schematic circuit diagram 600 includes a memory block 604 and a peripheral circuit 602. In some aspects, the example schematic circuit diagram 600 includes a plurality of memory strings 610, 620 and 630, with each of memory strings 610, 620 and 630 having a plurality of memory cells 608. The memory string 610 also includes at least one field effect transistor (e.g., MOSFET) at each end, which is controlled by a lower select gate (LSG) 612 and a top select gate (TSG) 614, respectively. The memory cell 608 can be controlled by a control gate, where the control gate can be connected to a word line 640 of the example schematic circuit diagram 600. The drain terminal of the TSG 614 can be connected to the bit line 618, and the source terminal of the LSG 612 can be connected to an ACS 616. The ACS 616 can be shared by the memory strings 610 in an entire memory block, and is also referred to as the common source line. In some examples, memory string 620 can be associated with bit line 628 and memory string 630 can be associated with bit line 638.

In some aspects, the example schematic circuit diagram 600 can be formed based on the floating gate technology. In some aspects, the example schematic circuit diagram 600 can be formed based on charge trapping technology. The NAND flash memory based on charge trapping can provide high storage density and high intrinsic reliability. Storage data or logic states (e.g., threshold voltage $V_{th}$ of the memory cell 608) depends on the amount of charge trapped in a storage layer. In some aspects, the memory block 604 can be a three-dimensional (3D) memory device, and the example schematic circuit diagram 600 can be a 3D memory array, where the memory cells 608 can be vertically stacked on top of each other.

In a NAND memory, the memory cell 608 can be in an erase state ER or a programmed state P1. Initially, all memory cells 608 in the example schematic circuit diagram 600 can be reset to the erase state ER as logic "1" by implementing a negative voltage difference between control gates and source terminals of the memory cells (e.g., the ACS 616) such that all the trapped electronic charges in the storage layer of the memory cells 608 can be removed. For example, the negative voltage difference can be induced by setting the control gates of the memory cells 608 to ground, and applying a high positive voltage to the ACS 616. At the erase state ER ("state ER"), the threshold voltage $V_{th}$ of the memory cells 608 can be reset to the lowest value, and can be measured or sensed at the bit line 618.

During programming (i.e., writing), a programming voltage $V_{pgm}$ (e.g., a positive voltage pulse between 10 V and 20 V) can be applied on the control gate such that electronic charges (e.g., electrons) can be injected into the storage layer of the memory cell 608, and thereby increase the threshold voltage $V_{th}$ of the memory cell 608. Thus the memory cell 608 is programmed to the state P1. In some examples, memory cell 608 may be programmed to different states, such as P2-P15 in QLC mode.

Figure 6B:
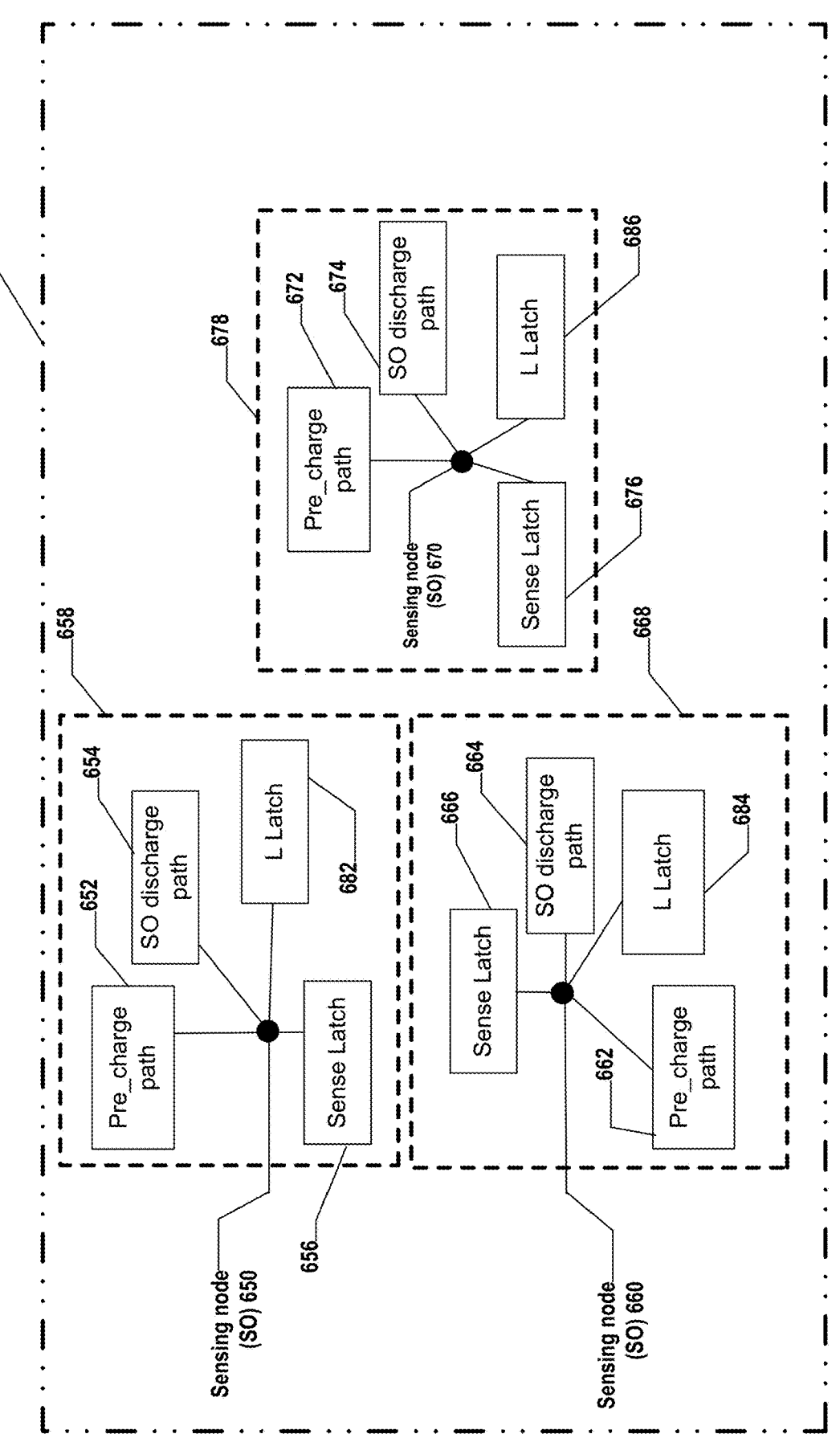
FIG. 6B illustrates an example schematic diagram of a page buffer of a memory device, according to some aspects of the present disclosure.

FIG. 6B illustrates example schematic diagram of a page buffer of a memory device, according to some implementations. FIG. 6B can be described with regard to page buffer 52 of FIG. 4 and elements of FIGS. 1-6A. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

As illustrated in FIG. 6B, page buffer 52 includes a first page buffer structure 658, a second page buffer structure 668, and a third page buffer structure 678. In some examples, first page buffer structure 658 may be connected with memory string 610 through bit line 618 of FIG. 6A. In some examples, second page buffer structure 668 may be connected with memory string 620 through bit line 628 of FIG. 6A. In some examples, third page buffer structure 678 may be connected with memory string 630 through bit line 638 of FIG. 6A.

As shown in FIG. 6B, first page buffer structure 658 includes a sensing node (SO) 650, a pre-charge path 652, a SO discharge path 654, an L latch 682, and a sense latch 656. Second page buffer structure 668 includes a sensing node (SO) 660, a pre-charge path 662, a SO discharge path 664, an L latch 684, and a sense latch 666. Third page buffer structure 678 includes a sensing node (SO) 670, a pre-charge path 672, a SO discharge path 674, an L latch 686, and a sense latch 676. Each of page buffer structures 658, 668, and 678 can further include a cache latch and one or more data latches (e.g., cache latch 710 and data latches 706 and 708 of FIG. 7B).

As described with reference to FIG. 4, during a read operation, the row decoder/word line driver 40 can transfer a read voltage Vread to a selected word line to an unselected word line according to the X-path control signal received from the controller 70. The page buffer 52 can be configured to read data from and to the memory block 103 according to the control signal Y-path control from the controller 70. During the read operation, page buffer 52 can sense current flowing through the bit line 341 that reflects the logic state (i.e., data) of the memory cell 340 and amplify small signal to a measurable magnification.

During a read operation, first page buffer structure 658 may precharge bit line 618 through pre-charge path 652 by a control logic (e.g., control circuit 70) and may sense at SO 650 whether a selected memory cell is turned on or off. Second page buffer structure 668 and third page buffer structure 678 may respectively precharge bit lines connected thereto based on the same procedure as the precharging operation of the above-described first page buffer structure 658.

During a read operation, bit line 618 and SO 650 may be precharged to a pre-determined level during a pre-charge period. A current can be generated (e.g., in a channel) so as to flow into first page buffer structure 658 through the bit line 618. During a develop period with a develop time, when the selected memory cell is in a first state (e.g., on cell), a charge charged at SO 650 may be discharged to the ACS 616 through bit line 618 and the channel of a cell string through SO discharge path 654. In this case, because the current flowing to first page buffer structure 658 is relatively great, the speed of a voltage drop of SO 650 may be relatively fast. On the other hand, during the develop period with the develop time, when the selected memory cell is in a second state (e.g., off cell), it may be difficult for a charge charged at SO 650 to be discharged to ACS 616 through bit line 618. Accordingly, because the current flowing to first page buffer structure 658 is relatively small, the speed of a voltage drop of SO 650 may be relatively slow.

During a latch period, a state of SO 650 associated with the selected memory cell may be latched to sense latch 656 as a first state of the selected memory cell with a logical value of 1. Alternatively, a state of SO 650 associated with the selected memory cell may be latched to sense latch 656 as a second state of the selected memory cell with a logical value of 0. In some examples, a threshold voltage of the selected memory cell in the first state is larger than a read voltage in the read operation and a threshold voltage of the selected memory cell in the second state is smaller than a read voltage in the read operation. In some examples, a memory cell is in the first state when the memory cell is turned on when a read voltage level is applied, and a memory cell is in the second state when the memory cell is turned off when a read voltage level is applied.

In some examples, second page buffer structure 668 and third page buffer structure 678 may respectively discharge bit lines connected thereto and sense a state of sensing node as a first state or a second state of the selected memory cell based on the same procedure as the operations of the above-described first page buffer structure 658.

In some examples, during a read operation, a develop time during the develop period may be different for each of first page buffer structure 658, second page buffer structure 668 and third page buffer structure 678. The sensing node, pre-charge path, SO discharge path and sense latch associated with each of first page buffer structure 658, second page buffer structure 668 and third page buffer structure 678 can be controlled separately in different configurations.

Figure 7A:
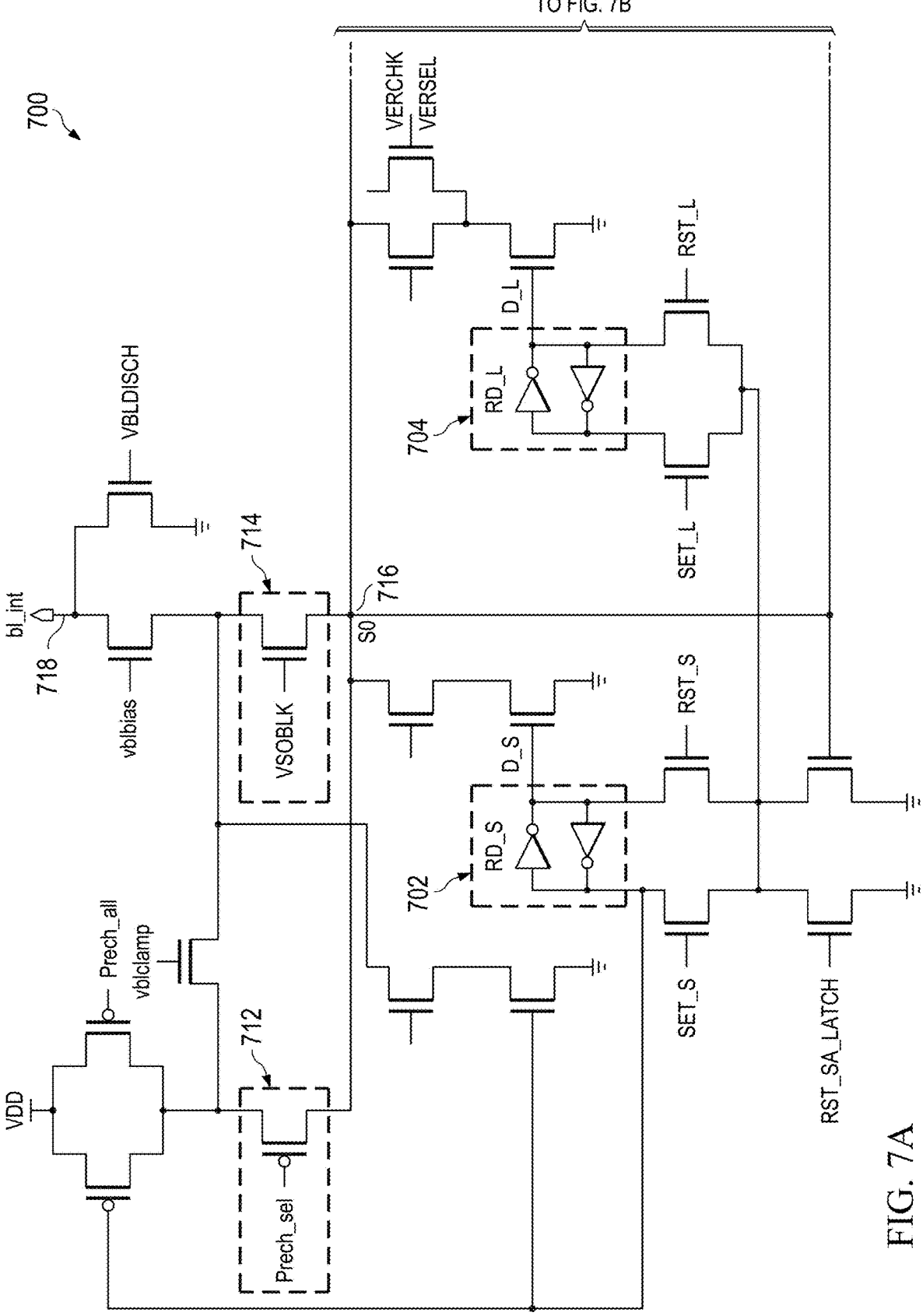
FIGS. 7A-7B illustrate an example page buffer of a memory device, according to some aspects of the present disclosure.
Figure 7B:
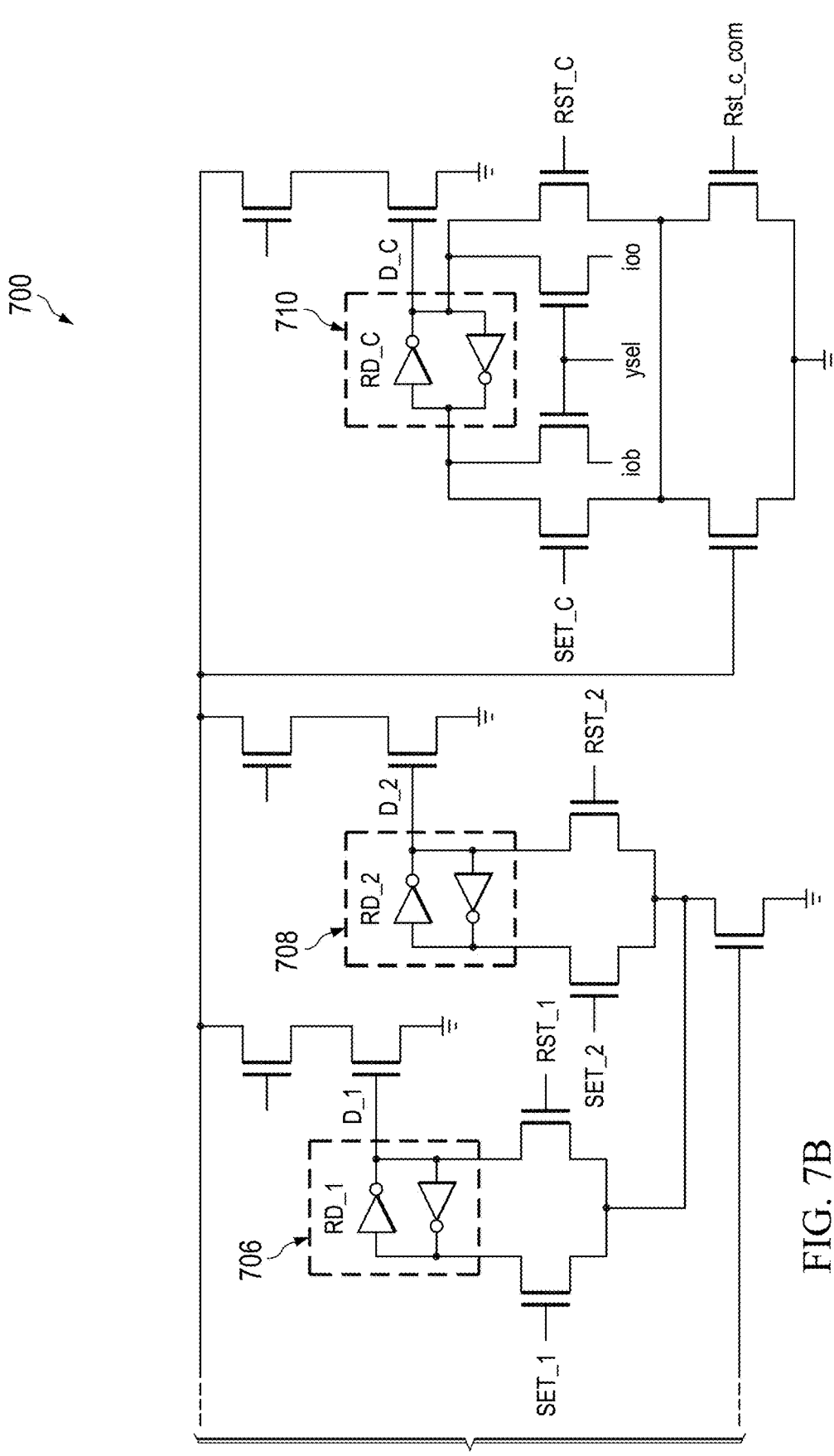

FIGS. 7A-7B illustrate an example page buffer 700 of a memory device, according to some aspects of the present disclosure. Page buffer 700 can be an example of page buffer 52 of FIG. 4. Page buffer 700 includes a sensing latch 702, an L latch 704, data latches 706 and 708, and a cache latch 710. Sensing latch 702 can be configured to store a sensing operation result. L latch 704 can be configured to support a fail bit count (FBC) function. In some implementations, multi-level cells (MLCs) coupled to a same word line can have multiple pages. Each page can be read using multiple read levels. Data latches 706 and 708 can be configured to store sensing operation results for each of the multiple read levels of a page of an MLC. Cache latch 710 can be configured to cache data before the data is sent out. As shown in FIGS. 7A-7B, page buffer 700 further includes transistors 712 and 714. Transistor 712 is coupled between a pre-charging circuit and a sensing node 716. Transistor 714 is coupled between the sensing node 716 and a corresponding bit line 718. Transistors 712 and 714 can be used to determine a length of a develop time. The develop time can be a delay between a time when transistor 712 is turned off and a time when transistor 714 is turned off.

Figure 8:
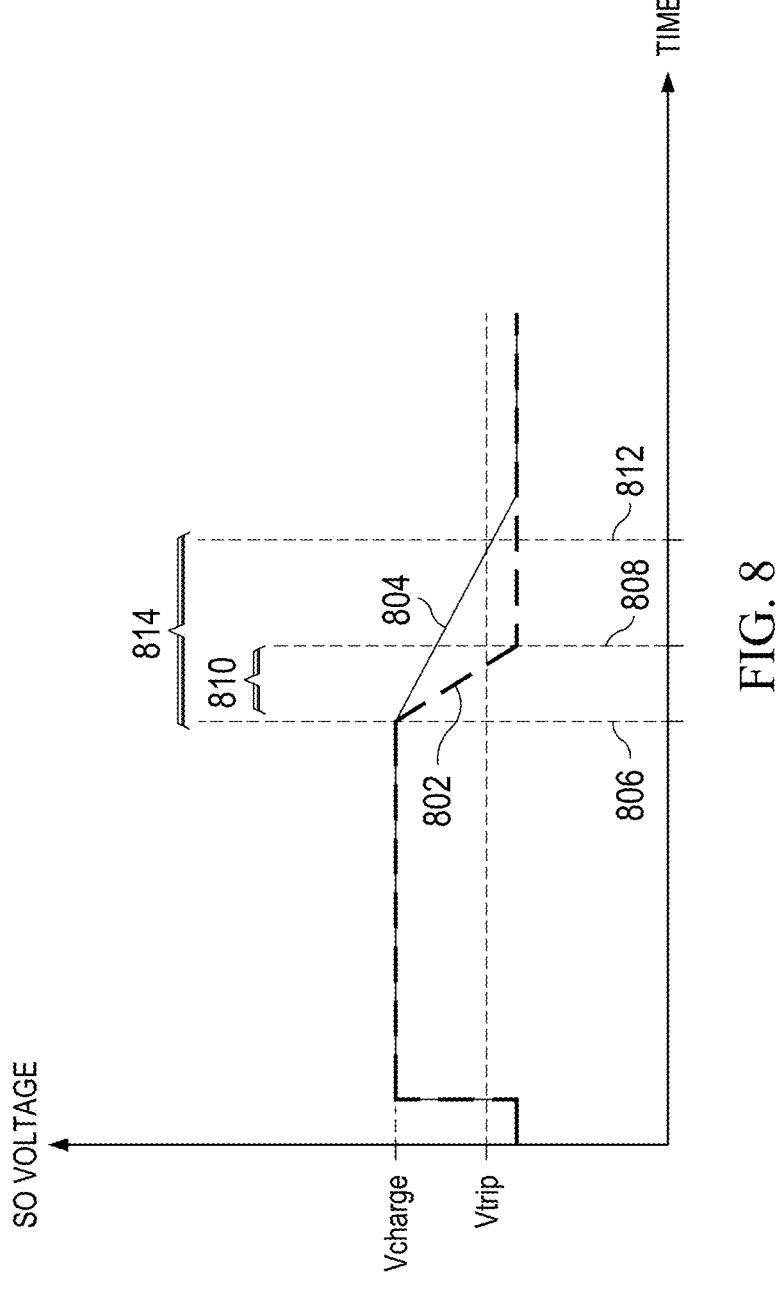
FIG. 8 illustrates example sensing node voltages of various sensing operations, according to some aspects of the present disclosure.

FIG. 8 illustrates example sensing node voltages of various sensing operations, according to some aspects of the present disclosure. Waveform 802 can be used to illustrate an example (Example 1) of a voltage level at a sensing node (SO) coupled to a memory cell with a threshold voltage Vt, when a read voltage Vrd1 (Vrd1>Vt) is applied to the memory cell (e.g., a gate of the memory cell or a word line coupled to the memory cell). As shown in FIG. 8, prior to time 806, the SO is precharged to a higher voltage level $V_{charge}$. The SO starts to discharge at time 806 (i.e., transistor 712 of FIG. 7A is turned off), and thus the voltage at the SO (also referred to as the SO voltage) starts to decrease. At time 808 (i.e., transistor 714 of FIG. 7A is turned off), the SO voltage can be measured and compared to a trip voltage (Vtrip). A result (e.g., a logic value of 0 or 1) of this sensing operation can be stored in a sensing latch coupled to the SO. For example, if the SO voltage at time 808 is lower than Vtrip, the result of this sensing operation is logic value 1. Otherwise, if the SO voltage at T2 is higher than Vtrip, the result of this sensing operation is logic value 0. The time duration (e.g., 810) between a time when the discharge starts (e.g., time 806) and a time when the SO voltage is measured and compared to Vtrip (e.g., time 808) can be referred to as a develop time. In this example, when read voltage Vrd1 (Vrd1>Vt) and develop time Td1 are applied, the SO voltage drops fast as the memory cell is turned on. Thus, the result of the sensing operation in Example 1 is logic value 1.

Waveform 804 shows another example (Example 2) of the SO voltage when another read voltage Vrd2 (Vrd2<Vt) is applied to the memory cell. In Example 2, the memory cell is turned off since Vrd2<Vt. As a result, the SO voltage decreases slowly in waveform 804. If the same develop time 810 is applied, the result of the sensing operation in Example 2 is logic value 0, which is different from the result in Example 1.

In another example (Example 3), read voltage Vrd2 (Vrd2<Vt) is still applied to the memory cell, but a different develop time (between time 806 and time 812, which can be referred to as 814) is used. As shown in FIG. 8, develop time 814 is longer than develop time 810. Thus, the SO voltage keeps dropping after time 808. The SO voltage measured at time 812 is lower than Vtrip. Accordingly, the result of the sensing operation in Example 3 is logic value 1, which is the same as the result in Example 1.

FIG. 8 illustrates that a sensing operation (e.g., Example 3) using a lower read voltage (e.g., Vrd2) and a longer develop time (e.g., 814) can obtain substantially the same result as another sensing operation (e.g., Example 1) using a higher read voltage (e.g., Vrd1) and a shorter develop time (e.g., 810). In other words, in sensing operations and read operations, fixing a read voltage and varying a develop time can have the same effects as varying the read voltage and fixing the develop time. Thus, sensing operations that use various read voltages and the same default develop time can be replaced by sensing operations that use the same read voltage but various develop times.

Figure 9:
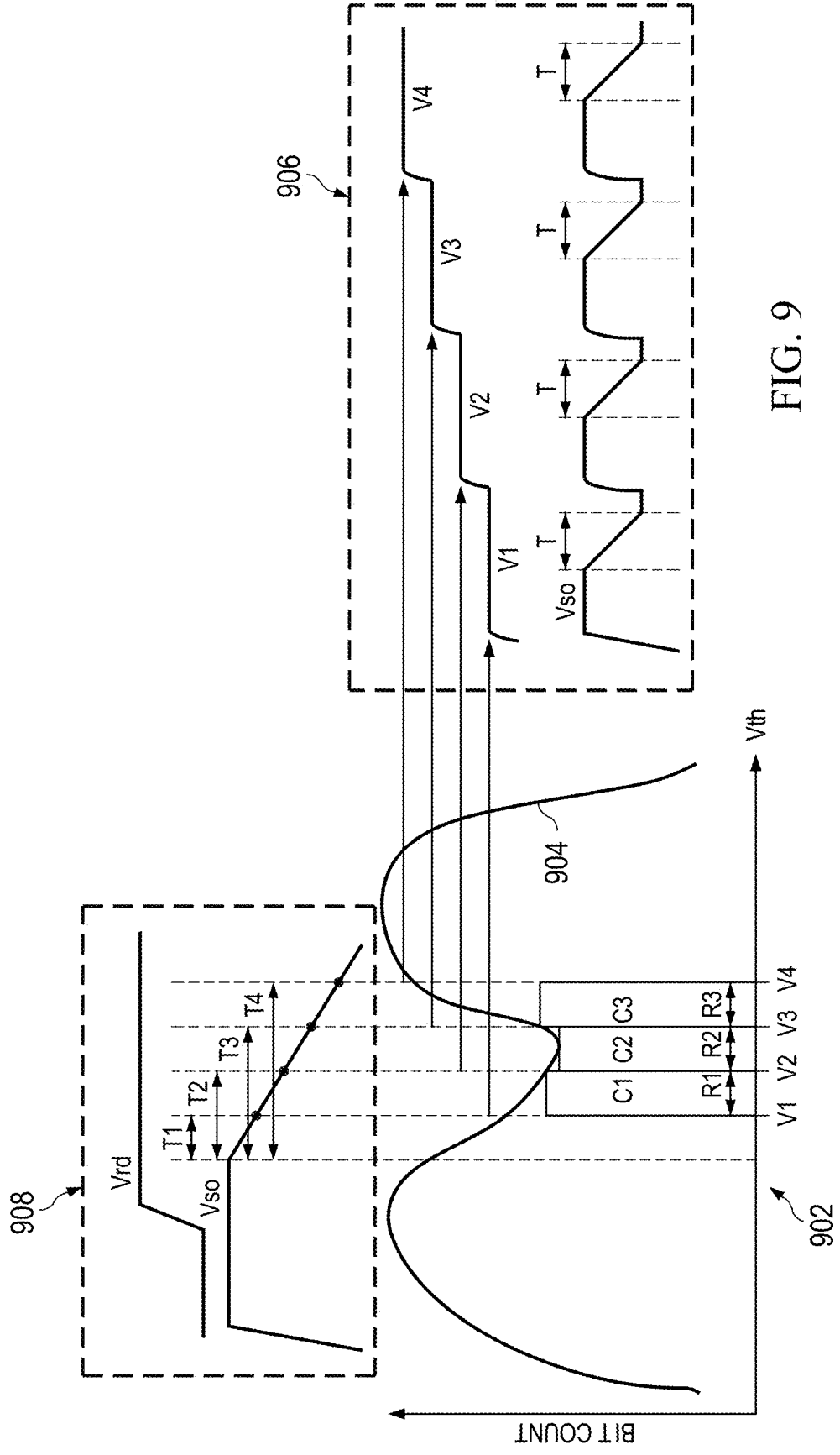
FIG. 9 illustrates example valley detection methods, according to some aspects of the present disclosure.

FIG. 9 illustrates example valley detection methods, according to some aspects of the present disclosure. Curve 904 in diagram 902 includes two threshold voltage distributions for two adjacent states of memory cells in a memory device. The memory cells are coupled to a same word line. In some implementations, the memory cells can belong to one or more memory pages. A valley detection method can be used to determine a valley on curve 904 between the two threshold voltage distributions. The valley can be used as a read voltage in memory read operations. In some implementations, the valley detection method includes determining a set of voltage ranges around the valley and determining a number for each of the set of voltage ranges. The number for each voltage range represents a quantity of memory cells whose threshold voltages fall within the voltage range. The valley is in a voltage range with the smallest number. For example, as shown in FIG. 9, four reference voltages V1, V2, V3, and V4 (V1<V2<V3<V4) can be used to generate three voltage ranges (R1, R2, and R3) around the valley.

In some implementations, as shown in diagram 906 of FIG. 9, the number for each voltage range can be determined using sensing operations based on these reference voltages. For example, a quantity of the memory cells (referred to as Ni, $1 \leq i \leq 4$) whose threshold voltages are higher than reference voltage Vi can be determined by applying Vi to the memory cells (e.g., the word line coupled to the memory cells) and performing sensing operations on sensing nodes coupled to the memory cells through respective bit lines. These sensing operations can use a same develop time (e.g., a default develop time T as shown in FIG. 9). A quantity of memory cells (Ci, $1 \leq i \leq 3$) whose threshold voltages fall within each voltage range (Ri) can then be determined based on the quantities N1, N2, N3, and N4. For example, Ci=Ni−Ni+1 ($1 \leq i \leq 3$). In practical implementations, such comparisons can be performed using logical operations XOR based on results stored in sensing latches coupled to the sensing nodes. In this example, C2 is the smallest number among C1, C2, and C3. Thus, the reference voltage V2 (i.e., lower limit of voltage range R2) can be determined as the valley of the threshold voltage distribution curve 904 and can be used as a read voltage during read operations of the memory cells. In some implementations, any other suitable values determined based on voltage range R2 (such as upper limit V3 or an average between V2 and V3) can be the valley of the threshold voltage distribution curve 904.

The valley detection method illustrated by diagram 906 can be time consuming because determining each of the quantities N1, N2, N3, and N4 may require the sensing operations to apply a different voltage to the word line coupled to the memory cells. As described with respect to FIG. 8, sensing operations that use various read voltages and the same default develop time can be equivalent to sensing operations that use the same read voltage but various develop times. Thus, in some implementations, as shown in diagram 908, a valley detection method can be performed based on sensing operations using a same read voltage and dynamic develop times. In some implementations, sensing operations using dynamic develop times can be performed in parallel to make the valley detection method even more efficient.

The valley detection method illustrated by diagram 908 can use a set of develop times Ti ($1 \leq i \leq 4$). Each of the set of develop times Ti corresponds to and can be determined based on a respective reference voltage (e.g., the reference voltage Vi described with respect to diagram 906). In some implementations, voltage ranges R1, R2, and R3 have the same size, thus any two adjacent reference voltages in the reference voltages Vi ($1 \leq i \leq 4$) have a same voltage difference. In other words, $Vi = V1 + (i-1) \times \Delta V$ ($1 \leq i \leq 4$) where $\Delta V$ is a predetermined voltage difference. As an approximation, the following develop times can be used in a practical implementation: $T_i = T_1 + (i-1) \times \Delta T$ ($1 \leq i \leq 4$). In this case, $\Delta T$ is a predetermined time period, and $T_i$ and $\Delta T$ can be determined based on the reference voltages Vi. For example, a product can use T1=0.5 µs, T2=0.6 µs, T3=0.7 µs, and T4=0.8 µs ($\Delta T$=0.1 µs).

First, a read voltage Vrd can be applied to the word line coupled to the memory cells. During a coarse sensing step, sensing operations using develop time T1 are performed on the memory cells. Based on results of the coarse sensing step, a subset of memory cells can be selected from the memory cells. The subset of memory cells have threshold voltages higher than the reference voltage V1. Only the subset of memory cells are used in the following steps of the valley detection method because the other memory cells have threshold voltages (lower than V1) fall out of voltage ranges R1, R2, and R3.

Next, the subset of memory cells can be divided into three groups of equal size (e.g., group 1, group 2, and group 3). Because each of the subset of memory cells is coupled to a respective bit line, the bit lines coupled to the subset of memory cells are also divided into the three groups. This process can be referred to as bit line setup. Each group corresponds to a voltage range. For example, group i can be assigned to voltage range Ri ($1 \leq i \leq 3$).

The valley detection method illustrated by diagram 908 further includes fine sensing steps performed on each group (e.g., group i, $1 \leq i \leq 3$) of memory cells. The fine sensing steps can determine a quantity of memory cells (e.g., Ci) in each group whose threshold voltages fall within a corresponding voltage range (e.g., Ri). Specifically, a first fine sensing step for group i includes sensing operations performed on group i using develop time $T_i$ to determine a quantity of memory cells (referred to as Ni) in group i whose threshold voltages are higher than reference voltage Vi. And a second fine sensing step for group i includes sensing operations performed on group i using develop time Ti+1 to determine a quantity of memory cells (referred to as Mi) in group i whose threshold voltages are higher than reference voltage Vi+1. Thus, Ci can be determined as Ni−Mi ($1 \leq i \leq 3$). The valley of the threshold voltage distributions is within the voltage range corresponding to the smallest Ci, which can be referred to as $R_J$, where J=argmin $C_i$ ($1 \leq i \leq 3$). In some implementations, reference voltage $V_J$ (i.e., lower limit of voltage range $R_J$) can be determined as the valley of the threshold voltage distributions and can be used as a read voltage during read operations of the memory cells. In some implementations, any other suitable values determined based on voltage range $R_J$ (such as upper limit $V_{J+1}$ or an average between $V_J$ and $V_{J+1}$) can be the valley of the threshold voltage distributions.

In some implementations, these fine sensing steps can be performed using parallel sensing operations because the same read voltage Vrd is applied to the three groups of memory cells. For example, the sensing operations in the first fine sensing for the three groups can be performed in parallel, and the sensing operations in the second fine sensing for the three groups can be performed in parallel.

It should be noted that the number of develop times, reference voltages, voltage ranges, and groups shown in FIG. 9 is for illustration only and that any suitable number of develop times, reference voltages, voltage ranges, and groups can be applied in a valley detection method provided in the present disclosure. For example, after the course sensing step, the selected subset of memory cells can be divided into four groups.

In some implementations, a develop time (e.g., $T_J$) corresponding to the reference voltage $V_J$ can represent the valley and can be provided to a user of the memory device. The user can choose how to use the develop time $T_J$. For example, the user can convert develop time $T_J$ to the corresponding reference voltage $V_J$ and can apply $V_J$ as a read voltage and use a default develop time during read operations subsequent to determining the valley. Alternatively, the user can apply reference voltage Vrd as a read voltage and use develop time $T_J$ during the subsequent read operations. Directly applying develop time $T_J$ may avoid possible inaccuracies caused by converting a develop time to a reference voltage.

Figure 10:
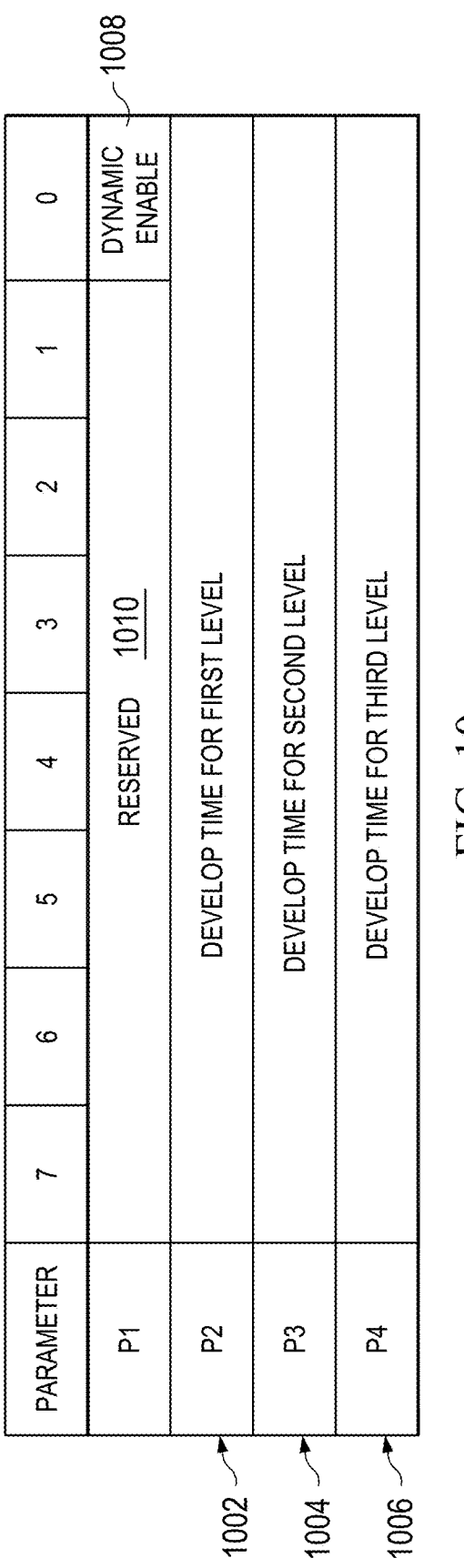
FIG. 10 illustrates an example data structure provided by a memory device to a user, according to some aspects of the present disclosure.

FIG. 10 illustrates an example data structure 1000 provided by a memory device to a user, according to some aspects of the present disclosure. Data structure 1000 has four bytes and includes develop times 1002, 1004, and 1006 for multiple read levels of an MLC page. For example, TLC memory cells can have three pages per word line including upper page, middle page, and lower page. Develop time 1002 can be provided for level 2 (e.g., Vrd2) of the middle page. Develop time 1004 can be provided for level 4 (e.g., Vrd4) of the middle page. Develop time 1006 can be provided for level 6 (e.g., Vrd6) of the middle page. In another example, develop time 1002 can be provided for level 3 (e.g., Vrd3) of the upper page, develop time 1004 can be provided for level 7 (e.g., Vrd7) of the upper page, and develop time 1006 can be empty. Develop times 1002, 1004, and 1006 each have a size of one byte. It should be noted that the data structure 1000 as shown in FIG. 10 is for illustration only and that any suitable number of develop times can be stored in the data structure 1000.

In some implementations, the data structure 1000 may further include a dynamic enable bit 1008. Enabling dynamic enable bit 1008 can indicate that dynamic develop times (e.g., develop times 1002, 1004, and 1006) instead of a default develop time are applied during a read operation. In some implementations, the data structure 1000 may further includes some reserved bits 1010.

In some implementations, a valley represented by a develop time can be stored in the memory device. For example, the develop time can be stored in at least one of a memory controller of the memory device or a memory array (e.g., a NAND memory array). Thus, when a user accesses the memory device, the user has an option to apply a dynamic develop time by loading the develop time from the memory device.

Figure 11:
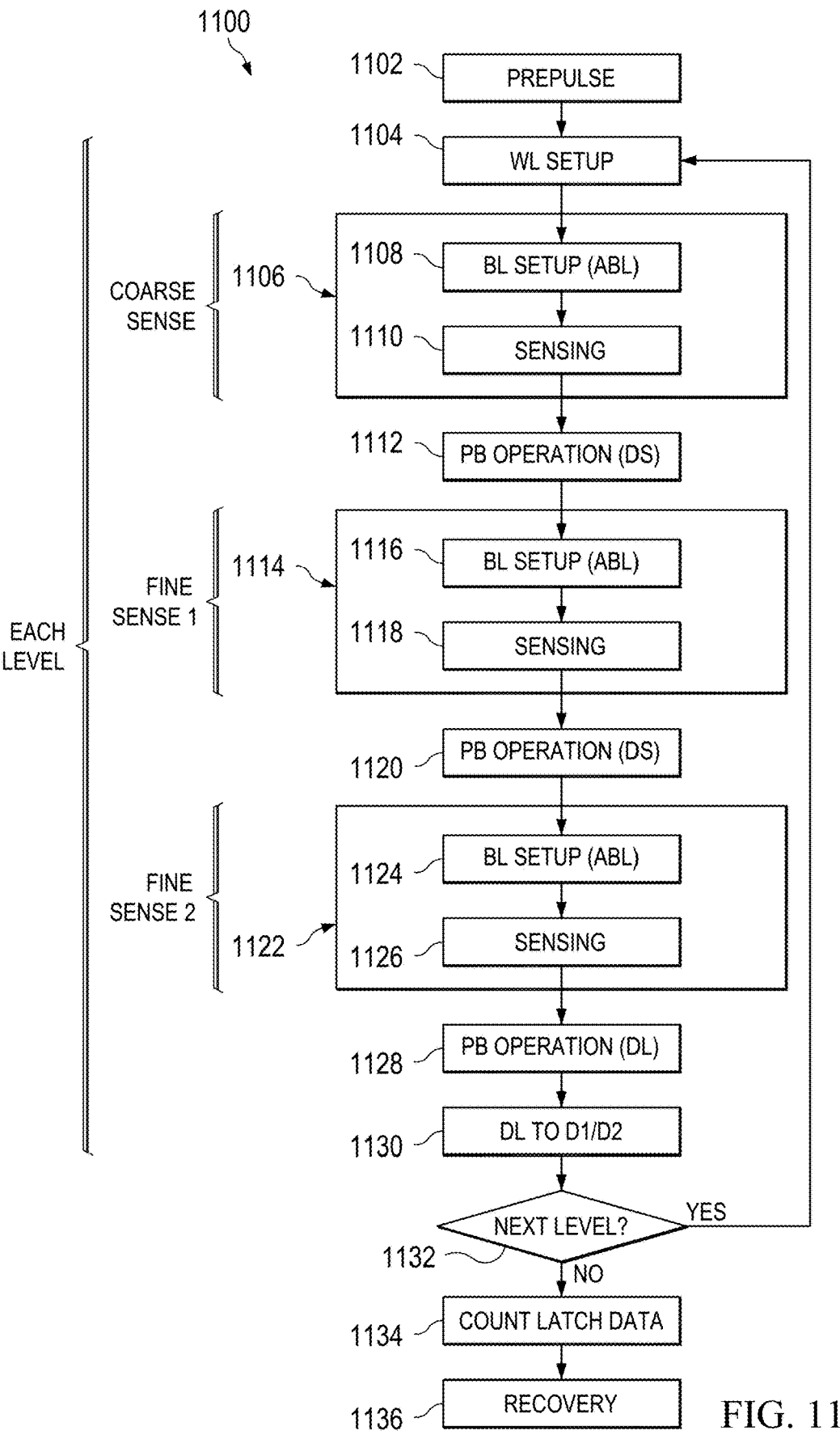
FIG. 11 illustrates an example flow chart of a valley detection method, according to some aspects of the present disclosure.

FIG. 11 illustrates an example flow chart of a valley detection method 1100, according to some aspects of the present disclosure. Method 1100 can be performed by a memory system having a memory controller (e.g., memory controller 20 of FIGS. 1, 2A, and 2B) and one or more memory devices programmed appropriately in accordance with this disclosure. Each memory device includes a peripheral circuit (e.g., peripheral circuits of FIG. 4 and FIG. 6A) that has a page buffer (e.g., page buffer 52 of FIG. 4 and page buffer 700 of FIGS. 7A-7B). The operations shown in the method 1100 may not be exhaustive and other operations can be performed as well before, after, or between any of the illustrated operations. Further, some of the operations may be performed simultaneously, or in a different order than shown in FIG. 11. The memory device can include MLC memory cells coupled to a same word line. Method 1100 can be used to determine threshold voltage distribution valleys for multiple read levels of the MLC memory cells corresponding to a page (e.g., level 3 and level 7 for an upper page of TLC memory cells).

At operation 1102, initial setups are performed. For example, prepulse voltages can be applied to some selection lines of the memory device.

At operation 1104, word line setup is performed for a first read level. A reference read voltage for the first read level can be applied to a selected word line. The first read level can be the lowest read level or the highest read level of the page. It should be noted that method 1100 can start either from the lowest read level to a higher read level or from the highest read level to a lower read level.

A set of reference voltages $V_1 < V_2 < \ldots < V_{N+1}$ and a set of develop times $T_1 < T_2 < \ldots < T_{N+1}$ can be determined, where N is an integer. As described with respect to diagram 908 of FIG. 9, develop times $T_i$ corresponds to and can be determined based on reference voltage $V_i$ ($1 \le i \le N+1$). Method 1100 can be used to select a reference voltage (as well as a develop time corresponding to the selected reference voltage) from the set of reference voltages that is closest to the valley for the first read level.

Operation 1106 can be a coarse sensing step (e.g., the coarse sensing step described with respect to diagram 908 of FIG. 9). A coarse sensing step can determine a coarse voltage range (e.g., higher than $V_1$). Memory cells whose threshold voltages fall out of the coarse voltage range can be excluded from some operations of method 1100, which can improve the speed and power efficiency of method 1100. Operation 1106 includes operation 1108 and operation 1110. At operation 1108, bit lines of the memory cells coupled to the same word line (the word line selected at operation 1104) are selected. Sensing nodes coupled to the memory cells through these bit lines can be pre-charged to a pre-determined voltage level. Since no memory cell is excluded at operation 1108, operation 1108 can also be referred to as an all bit line (ABL) setup. The memory cells can be divided into N groups (e.g., group 1, group 2, . . . , group N) of the same size at operation 1108. The N groups can be mapped to N voltage ranges generated based on the set of reference voltages. For example, voltage range i can be $[V_i, V_{i+1}]$ and can be mapped to group i, where ($1 \le i \le N$). Grouping of memory cells can be used to perform parallel sensing operations as described with respect to diagram 908 of FIG. 9. Alternatively, the grouping of memory cells can be performed at operation 1116 instead of operation 1108.

At operation 1110, sensing operations using develop time $T_1$ are performed on the sensing nodes coupled to the memory cells to determine whether a threshold voltage of each memory cell is lower than $V_1$ or higher than $V_1$.

At operation 1112, results of the sensing operations at operation 1110 can be stored in sensing latches of the memory device (e.g., sensing latch 702 of FIG. 7A) during page buffer (PB) operations. In some implementations, a logical value "1" is stored in a sensing latch if a threshold voltage of a memory cell coupled to the sensing latch is higher than $V_1$.

Operation 1114 can be referred to as a first fine sensing step, and operation 1122 can be referred to as a second fine sensing step. These fine sensing steps can determine a quantity of memory cells whose threshold voltages fall within each of the N voltage ranges. Operation 1114 includes operation 1116 and operation 1118. At operation 1116, appropriate voltages are applied to the bit lines coupled to the memory cells so that some of the bit lines are selected and other of the bit lines are unselected. Specifically, only memory cells whose threshold voltages are higher than $V_1$ are selected and can participate in the following operations for the current read level. In other words, memory cells whose threshold voltages are lower than $V_1$ are "knocked out" of the following operations for the current read level. The memory cells can be selected based on data stored in the sensing latches (operation 1112). In other words, a memory cell is selected if a sensing latch coupled to the memory cell stores logical value "1."

At operation 1116, the selected memory cells can be divided into N groups (e.g., group 1, group 2, . . . , group N) of the same size. Group i can be mapped to voltage range i, which is $[V_i, V_{i+1}]$ ($1 \le i \le N$). At operation 1116, sensing nodes coupled to the selected memory cells can be pre-charged to a pre-determined level.

At operation 1118, for group i ($1 \le i \le N$), sensing operations using develop time $T_i$ are performed on sensing nodes coupled to memory cells in group i to determine whether a threshold voltage of each memory cell is lower than $V_i$ or higher than $V_i$. The sensing operations in different groups can be performed in parallel (similar to those described with respect to diagram 908 of FIG. 9).

At operation 1120, results of sensing operations performed at operation 1118 can be stored in sensing latches coupled to the N groups of memory cells.

At operation 1124, bit lines coupled to the N groups of memory cells are selected and sensing nodes coupled to the N groups of memory cells are pre-charged to a pre-determined level. In some implementations, memory cells in group i whose threshold voltages are lower than $V_i$ can be "knocked out" (i.e., unselected) so that a size of each group if further reduced.

At operation 1126, for group i ($1 \le i \le N$), sensing operations using develop time $T_{i+1}$ are performed on sensing nodes coupled to memory cells in group i to determine whether a threshold voltage of each memory cell is lower than $V_{i+1}$ or higher than $V_{i+1}$. The sensing operations in different groups can be performed in parallel (similar to those described with respect to diagram 908 of FIG. 9).

At operation 1128, for each memory cell in the N groups, a logic operation XOR of a result of operation 1126 and a result of operation 1118 is stored in an L latch coupled to the memory cell. If data stored in the L latch is logic value "1," then it means the memory cell's threshold voltage falls within a voltage range mapped to its group. Thus, a quantity of memory cells whose threshold voltages fall within voltage range i [$V_i$, $V_{i+1}$] ($1 \le i \le N$) can be determined by counting L latches with logic value "1" coupled to memory cells in group i. In some implementations, the counting can be performed after sensing operations for all read levels are completed.

At operation 1130, the data stored in the L latches can be shifted to other latches so that the L latches can be used to store results of sensing operations for a next read level of the page. Results of sensing operations for the last read level can be left in the L latches. For example, a lower page of TLC memory cells can have two read levels. In this case, results of sensing operations for the first read level can be transferred from the L latches to a first set of data latches (e.g., data latch 706 of FIG. 7B), and results of sensing operations for the second read level can be stored in the L latches. In another example, a middle page of TLC memory cells can have three read levels. Accordingly, results of sensing operations for the first read level can be transferred from the L latches to first data latches (e.g., data latch 706 of FIG. 7B), results of sensing operations for the second read level transferred from the L latches to second data latches (e.g., data latch 708 of FIG. 7B), and results of sensing operations for the third read level can be stored in the L latches.

At operation 1132, method 1100 can check if sensing operations for all read levels have completed. If so, method 1100 can proceed to operations 1134, where data stored in one or more types of latches can be counted to determine the valley for each read level. If not, method 1100 can go back to operation 1104 and start preparing for sensing operations for a next read level.

At operation 1136, voltages at the word line and the bit lines can be discharged to recovery levels.

Figure 12:
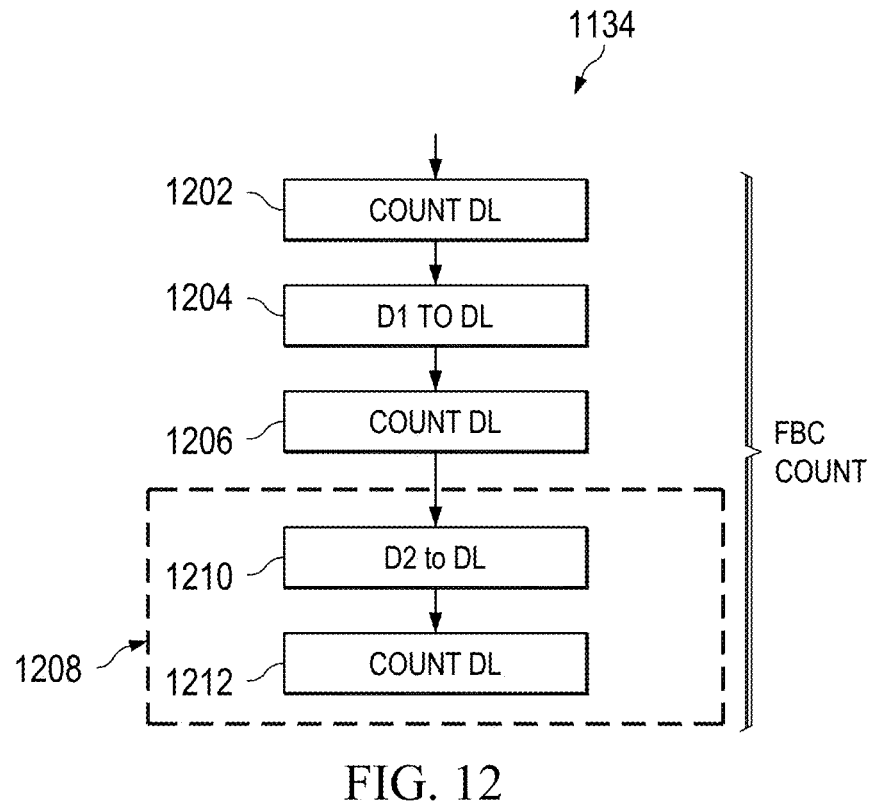
FIG. 12 illustrates an example flow chart of a latch operation of FIG. 11, according to some aspects of the present disclosure.

FIG. 12 illustrates an example flow chart of operations 1134 of FIG. 11, according to some aspects of the present disclosure. In some implementations, L latches can support a fail bit count (FBC) function. Thus, data counting can be performed at the L latches using the FBC function. At operation 1202, data stored in the L latches can be counted first using the FBC function that the L latches support. The data stored in the L latches can be results of sensing operations for the last read level (e.g., level 7 for an upper page of TLC memory cells). At operation 1204, data stored in first data latches (e.g., data latch 706 of FIG. 7B) can be transferred from the first data latches to the L latches. The data stored in first data latches can be results of sensing operations for another read level (e.g., level 3 for the upper page of the TLC memory cells). At operation 1206, the results of sensing operations for the other read level can be counted in the L latches.

In some implementations, there are three read levels (e.g., level 2, level 4, and level 6 for a middle page of TLC memory cells). Operations 1134 may further include operation 1208. The L latches can store results of sensing operations for level 6. The first data latches can store results of sensing operations for level 4. The second data latches can store results of sensing operations for level 2. At operation 1202, the results of sensing operations for level 6 are counted. At operation 1204, the results of sensing operations for level 4 are transferred from the first data latches to the L latches. At operation 1206, the results of sensing operations for level 4 are counted in the L latches. At operation 1210, the results of sensing operations for level 2 are transferred from the second data latches to the L latches. At operation 1212, the results of sensing operations for level 2 are counted in the L latches.

It will be understood that the flow chart illustrated in FIG. 12 is for illustration purpose, and that any suitable methods known in the art can be used to count results of sensing operations for different read levels.

Figure 13:
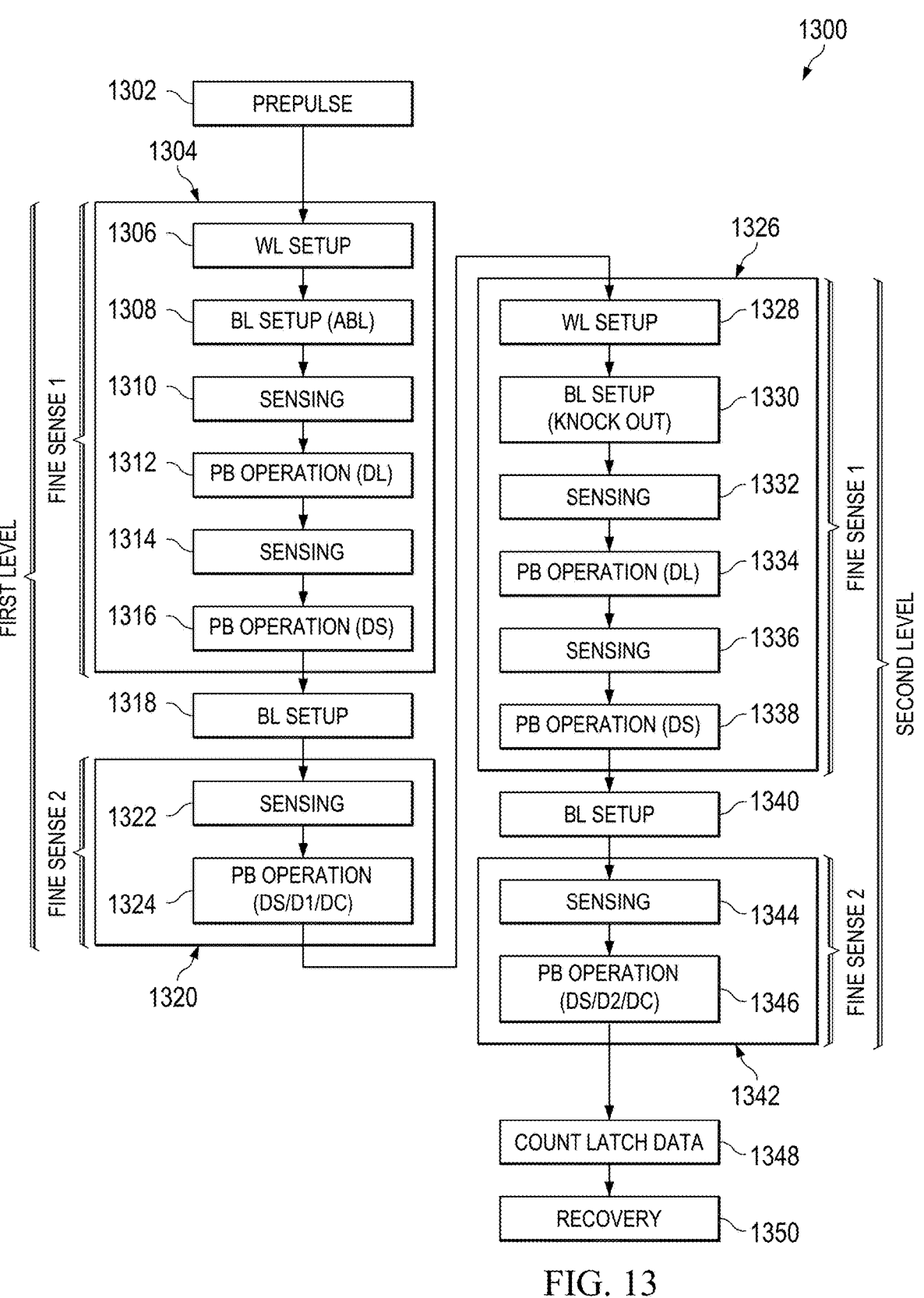
FIG. 13 illustrates an example flow chart of another valley detection method, according to some aspects of the present disclosure.

FIG. 13 illustrates an example flow chart of a valley detection method 1300, according to some aspects of the present disclosure. Method 1300 can be performed by a memory system having a memory controller (e.g., memory controller 20 of FIGS. 1, 2A, and 2B) and one or more memory devices programmed appropriately in accordance with this disclosure. Each memory device includes a peripheral circuit (e.g., peripheral circuits of FIG. 4 and FIG. 6A) that has a page buffer (e.g., page buffer 52 of FIG. 4 and page buffer 700 of FIGS. 7A-7B). The operations shown in the method 1300 may not be exhaustive and other operations can be performed as well before, after, or between any of the illustrated operations. Further, some of the operations may be performed simultaneously, or in a different order than shown in FIG. 13. The memory device can include memory cells coupled to a same word line. For illustration purposes, method 1300 is described with reference to an example MLC memory cell page that has two read levels (e.g., level 3 and level 7 for an upper page of TLC memory cells). It will be understood that method 1300 can be used to determine threshold voltage distribution valleys for any suitable number of read levels including one, two, and more than two.

At operation 1302, initial setups are performed. For example, prepulse voltages can be applied to some selection lines of the memory device.

At operation 1304, a first fine sensing step is performed for a first read level. The first read level can be the lowest read level or the highest read level of the page. It should be noted that method 1300 can start either from the lowest read level to a higher read level or from the highest read level to a lower read level. Operation 1304 includes operations 1306, 1308, 1310, 1312, 1314, and 1316.

At operation 1306, word line setup is performed for the first read level. A first reference read voltage for the first read level can be applied to a selected word line.

A first set of reference voltages $V_{1\_1} < V_{1\_2} < \ldots < V_{1\_N+1}$ and a first set of develop times $T_{1\_1} < T_{1\_2} < \ldots < T_{1\_N+1}$ can be determined, where N is an integer. As described with respect to diagram 908 of FIG. 9, develop times $T_{1\_i}$ corresponds to and can be determined based on reference voltage $V_{1\_i}$ ($1 \le i \le N+1$). A first set of N voltage ranges can be generated based on the first set of reference voltages. For example, voltage range i can be [$V_{1\_i}$, $V_{1\_i+1}$], ($1 \le i \le N$).

At operation 1308, bit lines of the memory cells coupled to the same word line (the word line selected at operation 1306) are selected. Sensing nodes coupled to the memory cells through these bit lines can be pre-charged to a pre-determined voltage level. Operation 1308 can be referred to as ABL setup (i.e., no memory cell coupled to the world line is excluded). The memory cells can be divided into N groups (e.g., group 1, group 2, . . . , group N) of the same size. Group i is mapped to voltage range i, ($1 \le i \le N$).

At operation 1310, sensing operations using develop time $T_{1\_1}$ are performed on the sensing nodes coupled to the memory cells to determine whether a threshold voltage of each memory cell is lower than $V_{1\_1}$ or higher than $V_{1\_1}$.

At operation 1312, results of the sensing operations at operation 1310 can be stored in L latches of the memory device (e.g., L latch 704 of FIG. 7A) during page buffer (PB) operations. In some implementations, a logical value "1" is stored in an L latch if a threshold voltage of a memory cell coupled to the sensing latch is higher than $V_{1\_1}$.

At operation 1314, for group i ($1 \leq i \leq N$), sensing operations using develop time $T_{1\_i}$ are performed on sensing nodes coupled to memory cells in group i to determine whether a threshold voltage of each memory cell is lower than $V_{1\_i}$ or higher than $V_{1\_i}$. The sensing operations in different groups can be performed in parallel (similar to those described with respect to diagram 908 of FIG. 9).

At operation 1316, results of sensing operations performed at operation 1314 can be stored in sensing latches (e.g., sensing latch 702 of FIG. 7A) coupled to the N groups of memory cells.

At operation 1318, bit lines coupled to the N groups of memory cells are selected and sensing nodes coupled to the N groups of memory cells are pre-charged to a pre-determined level. In some implementations, memory cells in group i whose threshold voltages are lower than $V_{1\_i}$ can be "knocked out" (i.e., unselected) so that a size of each group if further reduced.

At operation 1320, a second fine sensing step is performed for the first read level. Operation 1320 includes operations 1322 and 1324.

At operation 1322, for group i ($1 \leq i \leq N$), sensing operations using develop time $T_{1\_i+1}$ are performed on sensing nodes coupled to memory cells in group i to determine whether a threshold voltage of each memory cell is lower than $V_{1\_i+1}$ or higher than $V_{1\_i+1}$. The sensing operations in different groups can be performed in parallel (similar to those described with respect to diagram 908 of FIG. 9).

At operation 1324, for each memory cell in the N groups, a logic operation XOR of a result of operation 1314 and a result of operation 1322 is stored in a sensing latch coupled to the memory cell. If data stored in the sensing latch is logic value "1," then it means the memory cell's threshold voltage falls within a voltage range mapped to its group. In some implementations, data stored in the sensing latches can be transferred to other types of latches including first data latches (e.g., data latch 706 of FIG. 7B) and cache latches (e.g., cache latch 710 of FIG. 7B). This way, the sensing latches can still be used in some of the following operations for a next read level.

Method 1300 can proceed to operation 1326, where a first fine sensing step is performed for a second read level. Operation 1326 includes operations 1328, 1330, 1332, 1334, 1336, and 1338.

At operation 1328, word line setup is performed for the second read level. A second reference read voltage for the second read level can be applied to the selected word line. In some implementations, the second read level can be higher than the first read level, and the second reference read voltage can be higher than the first reference read voltage.

A second set of reference voltages $V_{2\_1} < V_{2\_2} < \ldots < V_{2\_N+1}$ and a second set of develop times $T_{2\_1} < T_{2\_2} < \ldots < T_{2\_N+1}$ can be determined, where N is an integer. As described with respect to diagram 908 of FIG. 9, develop times $T_{2\_i}$ corresponds to and can be determined based on reference voltage $V_{2\_i}$ ($1 \leq i \leq N+1$). A second set of N voltage ranges can be generated based on the second set of reference voltages. For example, voltage range i can be $[V_{2\_i}, V_{2\_i+1}]$, ($1 \leq i \leq N$).

At operation 1330, memory cells whose threshold voltages are lower than $V_{1\_1}$ can be "knocked out" (i.e., unselected) to improve the speed and power efficiency of method 1300. Because the second reference read voltage is higher than the first reference read voltage, threshold voltages of these unselected memory cells fall out of the second set of voltage ranges. Thus, these memory cells are not required in valley detection for the second read level. Memory cells whose threshold voltages are higher than $V_{1\_1}$ are selected, and sensing nodes coupled to the selected memory cells are pre-charged to a pre-determined level. The selecting and unselecting of memory cells can be based on data stored in the L latches (which is determined at operation 1312). The selected memory cells can be divided into N groups (e.g., group 1, group 2, . . . , group N) of the same size. Group i is mapped to voltage range i, ($1 \leq i \leq N$).

At operation 1332, sensing operations using develop time $T_{2\_1}$ are performed on the sensing nodes coupled to the memory cells to determine whether a threshold voltage of each memory cell is lower than $V_{2\_1}$ or higher than $V_{2\_1}$.

At operation 1334, results of the sensing operations at operation 1332 can be stored in the L latches of the memory device (e.g., L latch 704 of FIG. 7A) during page buffer (PB) operations. In some implementations, a logical value "1" is stored in an L latch if a threshold voltage of a memory cell coupled to the sensing latch is higher than $V_{2\_1}$.

At operation 1336, for group i ($1 \leq i \leq N$), sensing operations using develop time $T_{2\_i}$ are performed on sensing nodes coupled to memory cells in group i to determine whether a threshold voltage of each memory cell is lower than $V_{2\_i}$ or higher than $V_{2\_i}$. The sensing operations in different groups can be performed in parallel (similar to those described with respect to diagram 908 of FIG. 9).

At operation 1338, results of sensing operations performed at operation 1336 can be stored in the sensing latches (e.g., sensing latch 702 of FIG. 7A) coupled to the N groups of memory cells.

At operation 1340, bit lines coupled to the N groups of memory cells are selected and sensing nodes coupled to the N groups of memory cells are pre-charged to a pre-determined level. In some implementations, memory cells in group i whose threshold voltages are lower than $V_{2\_i}$ can be "knocked out" (i.e., unselected) so that a size of each group if further reduced.

At operation 1342, a second fine sensing step is performed for the second read level. Operation 1342 includes operations 1344 and 1346.

At operation 1344, for group i ($1 \leq i \leq N$), sensing operations using develop time $T_{2\_i+1}$ are performed on sensing nodes coupled to memory cells in group i to determine whether a threshold voltage of each memory cell is lower than $V_{2\_i+1}$ or higher than $V_{2\_i+1}$. The sensing operations in different groups can be performed in parallel (similar to those described with respect to diagram 908 of FIG. 9).

At operation 1346, for each memory cell in the N groups, a logic operation XOR of a result of operation 1336 and a result of operation 1344 is stored in a sensing latch coupled to the memory cell. If data stored in the sensing latch is logic value "1," then it means the memory cell's threshold voltage falls within a voltage range mapped to its group. In some implementations, data stored in the sensing latches can be transferred to other types of latches including second data latches (e.g., data latch 708 of FIG. 7B) and cache latches (e.g., cache latch 710 of FIG. 7B).

At operation 1348, the data stored in one or more types of latches can be counted to determine the valley for each read level (e.g., similar to a method described with respect to the flow chart 1134 of FIG. 12). In some implementations, the data can be transferred to the L latches to be counted using the FBC function supported by the L latches.

At operation 1350, voltages at the word line and the bit lines can be discharged to recovery levels.

Compared with another valley detection method 1100 illustrated by FIG. 11, the valley detection method 1300 includes fewer bit line setup steps. Method 1300 also can use sensing operation results at a lower read level to knock out memory cells that are not required by sensing operations at a higher read level (e.g., operation 1330). Furthermore, a structure of method 1300 is similar to a structure of a read operation. Thus, valleys determined by method 1300 can be more suitable for the read operation and can improve accuracy of the memory data read.

FIG. 14 illustrates an example method 1400 for operating a memory device, according to some aspects of the present disclosure. Method 1400 can be performed by a memory system having a memory controller (e.g., memory controller 20 of FIGS. 1, 2A, and 2B) and one or more memory devices programmed appropriately in accordance with this disclosure. Each memory device includes a peripheral circuit (e.g., peripheral circuits of FIG. 4 and FIG. 6A) that has a page buffer (e.g., page buffer 52 of FIG. 4 and page buffer 700 of FIGS. 7A-7B). The operations shown in the method 1400 may not be exhaustive and other operations can be performed as well before, after, or between any of the illustrated operations. Further, some of the operations may be performed simultaneously, or in a different order than shown in FIG. 14.

At operation 1402, method 1400 includes performing first sensing operations on memory cells of the memory device based on a first read voltage and a first set of develop times. The memory cells are coupled to a word line.

In some implementations, the first set of develop times includes N+1 develop times represented by $T_1, T_2, \ldots, T_{N+1}$ ($T_1 < T_2 < \ldots < T_{N+1}$), where N is an integer. Method 1400 further includes applying the first read voltage to the word line and upon discharging sensing nodes (e.g., sensing nodes 650, 660, and 670 of FIG. 6B) coupled to the memory cells for $T_1$, selecting a first subset of memory cells from the memory cells. Voltages at sensing nodes coupled to the first subset of memory cells are higher than a predetermined threshold (e.g., Vtrip of FIG. 8).

In some implementations, $T_i = T1 + (i-1) \times \Delta T$ ($2 \leq i \leq N+1$). $\Delta T$ is a predetermined time period. $T_i$ and $\Delta T$ are determined based on a series of reference voltages (e.g., voltages V1, V2, V3, and V4 of FIG. 9). Any two adjacent reference voltages in the series of reference voltages have a same voltage difference.

In some implementations, the first subset of memory cells comprises N groups of memory cells of a same size. The first sensing operations include, for memory cells in group i ($1 \leq i \leq N$) of the N groups: upon discharging sensing node coupled to the memory cells in group i for $T_i$, selecting a second subset of memory cells from the memory cells in group i, wherein voltages at sensing nodes coupled to the second subset of memory cells are higher than the predetermined threshold; upon discharging the sensing node coupled to the memory cells in group i for $T_{i+1}$, selecting a third subset of memory cells from the second subset of memory cells, wherein voltages at sensing nodes coupled to the third subset of memory cells are lower than the predetermined threshold; and determining a size of the third subset of memory cells, $C_i$, for group i.

At operation 1404, method 1400 includes selecting a first read develop time from the first set of develop times based on results of the first sensing operations.

In some implementations, selecting the first read develop time from the first set of develop times includes determining the first read develop time as develop time $T_J$ upon determining that $C_J$ is the smallest number among $C_i$ ($1 \leq i \leq N$).

At operation 1406, method 1400 includes performing a read operation on the memory cells based on the first read voltage and the first read develop time.

In some implementations, the read operation includes applying the first read voltage to the word line; and upon discharging sensing nodes coupled to the memory cells for the first read develop time, sensing data from the sensing nodes.

In some implementations, method 1400 further includes performing second sensing operations on the memory cells based on a second read voltage and a second set of develop times; and selecting a second read develop time from the second set of develop times based on results of the second sensing operations, wherein the first sensing operations and the second sensing operations are performed during a first read cycle.

In some implementations, the read operation comprises: applying the first read voltage to the word line; upon discharging sensing node coupled to the memory cells for the first read develop time, sensing first data from the memory cells; applying the second read voltage to the word line; and upon discharging the sensing node coupled to the memory cells for the second read develop time, sensing second data from the memory cells, wherein the read operation is performed during a second read cycle.

In some implementations, method 1400 further includes transmitting the first read develop time and the second read develop time to a user of the memory device (e.g., using data structure 1000 of FIG. 10).

In some implementations, the first read voltage and the first set of develop times are associated with a valley of threshold voltage distributions of a first pair of adjacent states of the memory cells; the first read develop time represents an estimate of the valley of the threshold voltage distributions of the first pair of adjacent states of the memory cells; the second read voltage and the second set of develop times are associated with a valley of threshold voltage distributions of a second pair of adjacent states of the memory cells; and the second read develop time represents an estimate of the valley of the threshold voltage distributions of the second pair of adjacent states of the memory cells.

FIG. 15 illustrates an example method 1500 for operating a memory device, according to some aspects of the present disclosure. Method 1500 can be performed by a memory system having a memory controller (e.g., memory controller 20 of FIGS. 1, 2A, and 2B) and one or more memory devices programmed appropriately in accordance with this disclosure. Each memory device includes a peripheral circuit (e.g., peripheral circuits of FIG. 4 and FIG. 6A) that has a page buffer (e.g., page buffer 52 of FIG. 4 and page buffer 700 of FIGS. 7A-7B). The operations shown in the method 1500 may not be exhaustive and other operations can be performed as well before, after, or between any of the illustrated operations. Further, some of the operations may be performed simultaneously, or in a different order than shown in FIG. 15.

At operation 1502, method 1500 includes determining first groups of memory cells in memory cells of the memory device and a first set of develop times, wherein each group of memory cells of the first groups of memory cells is associated with a respective pair of develop times in the first set of develop times.

At operation 1504, method 1500 includes performing first sensing operations on each group of memory cells of the first groups of memory cells based on the respective pair of develop times associated with the group of memory cells, wherein the first sensing operations comprise a first set of discharging and sensing operations and a second set of discharging and sensing operations.

At operation 1506, method 1500 includes selecting one of the first set of develop times as a first read develop time based on results of the first sensing operations.

In some implementations, method 1500 further includes: applying a first read voltage to a word line coupled to the memory cells; pre-charging sensing nodes coupled to the memory cells; upon discharging the sensing node coupled to the memory cells for a shortest develop time in the first set of develop times, determining first sensing results indicating whether a voltage at each of the sensing node coupled to the memory cells is higher than a predetermined threshold; and storing first sensing results in first latches.

In some implementations, the first groups of memory cells comprise N groups: group 1, group 2, . . . , group N, N being an integer; the first set of develop times comprises N+1 develop times represented by $T_1$, $T_2$, . . . , $T_{N+1}$ ($T_1 < T_2 < \ldots < T_{N+1}$); and the pair of develop times for group i comprises $T_i$ and $T_{i+1}$.

In some implementations, the first set of discharging and sensing operations on memory cells in group i ($1 \le i \le N$) comprise: upon discharging sensing node coupled to the memory cells in group i for $T_i$, determining second sensing results indicating whether a voltage at each of the sensing nodes coupled to the memory cells in group i is higher than the predetermined threshold; and storing second sensing results in second latches coupled to the memory cells in group i.

In some implementations, the second set of discharging and sensing operations on memory cells in group i ($1 \le i \le N$) comprise: pre-charging the sensing nodes coupled to the memory cells in group i; upon discharging the sensing node coupled to the memory cells in group i for $T_{i+1}$, determining third sensing results indicating whether a voltage at each of the sensing nodes coupled to the memory cells in group i is lower than the predetermined threshold; and storing XOR results of the second sensing results and the third sensing results in third latches coupled to the memory cells in group i.

In some implementations, selecting the one of the first set of develop times as the first read develop time comprises: determining a quantity of the third latches coupled to the memory cells in group i having a logical value of "1" Ci; and determining the first read develop time as develop time $T_J$ upon determining that $C_J$ is the smallest number among $C_i$ ($1 \le i \le N$).

In some implementations, $T_i = T_1 + (i-1) \times \Delta T$ ($2 \le i \le N+1$), and $\Delta T$ is a predetermined time period.

In some implementations, the memory cells are divided into the first groups of memory cells, the first latches are L latches, the second latches are sensing latches, and the third latches are first data latches.

In some implementations, method 1500 further includes determining second groups of memory cells based on the first sensing results. A subset of the memory cells is divided into the second groups of memory cells. The subset of the memory cells is selected based on the first sensing results such that voltages at sensing node coupled to the subset of the memory cells are higher than the predetermined threshold. Each group of the second groups of memory cells is associated with a respective pair of develop times in a second set of develop times.

In some implementations, method 1500 further includes applying a second read voltage to the word line; pre-charging sensing nodes coupled to the second groups of memory cells; performing second sensing operations on each group of the second groups of memory cells based on the respective pair of develop times in the second set of develop times; and selecting one of the second set of develop times as a second read develop time based on results of the second sensing operations.

In some implementations, the first read develop time and the second read develop time are determined in a first read cycle.

In some implementations, method 1500 further includes performing a read operation on the memory cells during a second read cycle based on the first read voltage, the first read develop time, the second read voltage, and the second read develop time.

In some implementations, the read operation includes applying the first read voltage to the word line; upon discharging sensing node coupled to the memory cells for the first read develop time, sensing first data from the memory cells; applying the second read voltage to the word line; and upon discharging the sensing node coupled to the memory cells for the second read develop time, sensing second data from the memory cells.

In some implementations, a subset of the memory cells is divided into the groups of memory cells, and the subset of the memory cells is selected based on the first sensing results such that voltages at sensing node coupled to the subset of the memory cells are higher than the predetermined threshold.

In some implementations, method 1500 further includes upon storing the first sensing results in the first latches, pre-charging sensing nodes coupled to the memory cells in group i ($1 \le i \le N$).

In some implementations, the first latches are sensing latches, the second latches are the sensing latches, and the third latches are L latches In some implementations, method 1500 further includes: applying a second read voltage to the word line; pre-charging the sensing nodes coupled to the memory cells; performing second sensing operations on each group of the first groups of memory cells based on a respective pair of develop times in a second set of develop times; and selecting one of the second set of develop times as a second read develop time based on results of the second sensing operations.

In some implementations, the first read develop time and the second read develop time are determined in a first read cycle.

In some implementations, method 1500 further includes performing a read operation on the memory cells during a second read cycle based on the first read voltage, the first read develop time, the second read voltage, and the second read develop time.

In some implementations, the read operation includes: applying the first read voltage to the word line; upon discharging sensing node coupled to the memory cells for the first read develop time, sensing first data from the memory cells; applying the second read voltage to the word line; and upon discharging the sensing node coupled to the memory cells for the second read develop time, sensing second data from the memory cells.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required be performed in the particular order shown or in sequential order, or that all illustrated operations be performed (some operations may be considered optional), to achieve desirable results. In certain circumstances, multi-tasking or parallel processing (or a combination of multi-tasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

According to one aspect of the present disclosure, a method for operating a memory device is provided. The method comprises performing first sensing operations on memory cells of the memory device based on a first read voltage and a first set of develop times, where the memory cells are coupled to a word line. The method further comprises selecting a first read develop time from the first set of develop times based on results of the first sensing operations; and performing a read operation on the memory cells based on the first read voltage and the first read develop time.

In some implementations, the first set of develop times comprise N+1 develop times represented by $T_1, T_2, \ldots, T_{N+1}$ ($T_1 < T_2 < \ldots < T_{N+1}$), where N is an integer. The method further comprises applying the first read voltage to the word line and upon discharging sensing nodes coupled to the memory cells for $T_1$, selecting a first subset of memory cells from the memory cells. Voltages at sensing nodes coupled to the first subset of memory cells are higher than a predetermined threshold.

In some implementations, $T_i = T_1 + (i-1) \times \Delta T$ ($2 \le i \le N+1$). $\Delta T$ is a predetermined time period. $T_i$ and $\Delta T$ are determined based on a series of reference voltages. Any two adjacent reference voltages in the series of reference voltages have a same voltage difference.

In some implementations, the first subset of memory cells comprises N groups of memory cells of a same size. The first sensing operations comprise, for memory cells in group i ($1 \le i \le N$) of the N groups: upon discharging sensing node coupled to the memory cells in group i for $T_i$, selecting a second subset of memory cells from the memory cells in group i, where voltages at sensing nodes coupled to the second subset of memory cells are higher than the predetermined threshold; upon discharging the sensing node coupled to the memory cells in group i for $T_{i+1}$, selecting a third subset of memory cells from the second subset of memory cells, where voltages at sensing nodes coupled to the third subset of memory cells are lower than the predetermined threshold; and determining a size of the third subset of memory cells, $C_i$, for group i.

In some implementations, selecting the first read develop time from the first set of develop times comprises determining the first read develop time as develop time $T_J$ upon determining that $C_J$ is the smallest number among $C_i$ ($1 \le i \le N$).

In some implementations, the read operation comprises applying the first read voltage to the word line and upon discharging sensing nodes coupled to the memory cells for the first read develop time, sensing data from the sensing nodes.

In some implementations, the method further comprises performing second sensing operations on the memory cells based on a second read voltage and a second set of develop times and selecting a second read develop time from the second set of develop times based on results of the second sensing operations. The first sensing operations and the second sensing operations are performed during a first read cycle.

In some implementations, the read operation comprises applying the first read voltage to the word line; upon discharging sensing node coupled to the memory cells for the first read develop time, sensing first data from the memory cells; applying the second read voltage to the word line; and upon discharging the sensing node coupled to the memory cells for the second read develop time, sensing second data from the memory cells, where the read operation is performed during a second read cycle.

In some implementations, the method further comprises transmitting the first read develop time and the second read develop time to a user of the memory device.

In some implementations, the first read voltage and the first set of develop times are associated with a valley of threshold voltage distributions of a first pair of adjacent states of the memory cells.

In some implementations, the first read develop time represents an estimate of the valley of the threshold voltage distributions of the first pair of adjacent states of the memory cells.

In some implementations, the second read voltage and the second set of develop times are associated with a valley of threshold voltage distributions of a second pair of adjacent states of the memory cells.

In some implementations, the second read develop time represents an estimate of the valley of the threshold voltage distributions of the second pair of adjacent states of the memory cells.

According to another aspect of the present disclosure, a method for operating a memory device is disclosed. The method comprises: determining first groups of memory cells in memory cells of the memory device and a first set of develop times, where each group of memory cells of the first groups of memory cells is associated with a respective pair of develop times in the first set of develop times; performing first sensing operations on each group of memory cells of the first groups of memory cells based on the respective pair of develop times associated with the group of memory cells, where the first sensing operations comprise a first set of discharging and sensing operations and a second set of discharging and sensing operations; and selecting one of the first set of develop times as a first read develop time based on results of the first sensing operations.

In some implementations, the method further comprises: applying a first read voltage to a word line coupled to the memory cells; pre-charging sensing nodes coupled to the memory cells; upon discharging the sensing node coupled to the memory cells for a shortest develop time in the first set of develop times, determining first sensing results indicating whether a voltage at each of the sensing node coupled to the memory cells is higher than a predetermined threshold; and storing first sensing results in first latches.

In some implementations, the first groups of memory cells comprise N groups: group 1, group 2, ..., group N, N being an integer. The first set of develop times comprises N+1 develop times represented by $T_1, T_2, \ldots, T_{N+1}$ ($T_1 < T_2 < \ldots < T_{N+1}$). The pair of develop times for group i comprises $T_i$ and $T_{i+1}$. The first set of discharging and sensing operations on memory cells in group i ($1 \le i \le N$) comprise: upon discharging sensing node coupled to the memory cells in group i for $T_i$, determining second sensing results indicating whether a voltage at each of the sensing nodes coupled to the memory cells in group i is higher than the predetermined threshold; and storing second sensing results in second latches coupled to the memory cells in group i. The second set of discharging and sensing operations on memory cells in group i ($1 \le i \le N$) comprise: pre-charging the sensing nodes coupled to the memory cells in group i; upon discharging the sensing node coupled to the memory cells in group i for $T_{i+1}$, determining third sensing results indicating whether a voltage at each of the sensing nodes coupled to the memory cells in group i is lower than the predetermined threshold; and storing XOR results of the second sensing results and the third sensing results in third latches coupled to the memory cells in group i.

In some implementations, selecting the one of the first set of develop times as the first read develop time comprises: determining a quantity of the third latches coupled to the memory cells in group i having a logical value of "1" $C_i$; and determining the first read develop time as develop time $T_J$ upon determining that $C_J$ is the smallest number among $C_i$ ($1 \le i \le N$).

In some implementations, $T_i = T_1 + (i-1) \times \Delta T$ ($2 \le i \le N+1$), and $\Delta T$ is a predetermined time period.

In some implementations, the memory cells are divided into the first groups of memory cells, the first latches are L latches, the second latches are sensing latches, and the third latches are first data latches.

In some implementations, the method further comprises determining second groups of memory cells based on the first sensing results. A subset of the memory cells is divided into the second groups of memory cells. The subset of the memory cells is selected based on the first sensing results such that voltages at sensing node coupled to the subset of the memory cells are higher than the predetermined threshold. Each group of the second groups of memory cells is associated with a respective pair of develop times in a second set of develop times.

In some implementations, the method further comprises applying a second read voltage to the word line; pre-charging sensing nodes coupled to the second groups of memory cells; performing second sensing operations on each group of the second groups of memory cells based on the respective pair of develop times in the second set of develop times; and selecting one of the second set of develop times as a second read develop time based on results of the second sensing operations.

In some implementations, the first read develop time and the second read develop time are determined in a first read cycle. The method further comprises performing a read operation on the memory cells during a second read cycle based on the first read voltage, the first read develop time, the second read voltage, and the second read develop time. The read operation comprises: applying the first read voltage to the word line; upon discharging sensing node coupled to the memory cells for the first read develop time, sensing first data from the memory cells; applying the second read voltage to the word line; and upon discharging the sensing node coupled to the memory cells for the second read develop time, sensing second data from the memory cells.

In some implementations, a subset of the memory cells is divided into the groups of memory cells. The subset of the memory cells is selected based on the first sensing results such that voltages at sensing node coupled to the subset of the memory cells are higher than the predetermined threshold. The method further comprises upon storing the first sensing results in the first latches, pre-charging sensing nodes coupled to the memory cells in group i ($1 \le i \le N$).

In some implementations, the first latches are sensing latches, the second latches are the sensing latches, and the third latches are L latches.

In some implementations, the method further comprises: applying a second read voltage to the word line; pre-charging the sensing nodes coupled to the memory cells; performing second sensing operations on each group of the first groups of memory cells based on a respective pair of develop times in a second set of develop times; and selecting one of the second set of develop times as a second read develop time based on results of the second sensing operations.

In some implementations, the first read develop time and the second read develop time are determined in a first read cycle. The method further comprises performing a read operation on the memory cells during a second read cycle based on the first read voltage, the first read develop time, the second read voltage, and the second read develop time. The read operation comprises: applying the first read voltage to the word line; upon discharging sensing node coupled to the memory cells for the first read develop time, sensing first data from the memory cells; applying the second read voltage to the word line; and upon discharging the sensing node coupled to the memory cells for the second read develop time, sensing second data from the memory cells.

According to another aspect of the present disclosure, a memory device is provided. The memory device comprises: a memory array comprising a word line and memory cells coupled to the word line; and a peripheral circuit comprising a control circuit and a page buffer. The control circuit is configured to perform operations comprising determining first groups of memory cells in the memory cells and a first set of develop times, wherein each group of memory cells of the first groups of memory cells is associated with a respective pair of develop times in the first set of develop times; performing first sensing operations on each group of memory cells of the first groups of memory cells based on the respective pair of develop times associated with the group of memory cells; and selecting one of the first set of develop times as a first read develop time based on results of the first sensing operations.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents. Accordingly, other implementations also are within the scope of the claims.

29

30

What is claimed is:

1. A method for operating a memory device, the method comprising:

performing first sensing operations on memory cells of the memory device based on a first read voltage and a first set of develop times, wherein a develop time represents a discharging time duration in a sensing operation, and the memory cells are coupled to a word line;

selecting a first read develop time from the first set of develop times based on results of the first sensing operations; and performing a read operation on the memory cells based on the first read voltage and the first read develop time.

2. The method according to claim 1, wherein the first set of develop times comprise N+1 develop times represented by $T_1, T_2, \ldots, T_{N+1}$ ($T_1<T_2< \ldots <T_{N+1}$), wherein N is an integer, and wherein the method further comprises:

applying the first read voltage to the word line; and upon discharging sensing nodes coupled to the memory cells for $T_1$, selecting a first subset of memory cells from the memory cells, wherein voltages at sensing nodes coupled to the first subset of memory cells are higher than a predetermined threshold.

3. The method according to claim 2, wherein $T_i=T_1+(i-1)\times\Delta T$ ($2\leq i\leq N+1$), wherein $\Delta T$ is a predetermined time period, wherein $T_i$ and $\Delta T$ are determined based on a series of reference voltages, and wherein any two adjacent reference voltages in the series of reference voltages have a same voltage difference.

4. The method according to claim 2, wherein the first subset of memory cells comprises N groups of memory cells of a same size, and wherein the first sensing operations comprise, for memory cells in group i ($1\leq i\leq N$) of the N groups:

upon discharging sensing node coupled to the memory cells in group i for $T_i$, selecting a second subset of memory cells from the memory cells in group i, wherein voltages at sensing nodes coupled to the second subset of memory cells are higher than the predetermined threshold;

upon discharging the sensing node coupled to the memory cells in group i for $T_{i+1}$, selecting a third subset of memory cells from the second subset of memory cells, wherein voltages at sensing nodes coupled to the third subset of memory cells are lower than the predetermined threshold; and determining a size of the third subset of memory cells, $C_i$, for group i.

5. The method according to claim 4, wherein selecting the first read develop time from the first set of develop times comprises:

determining the first read develop time as develop time $T_J$ upon determining that $C_J$ is the smallest number among $C_i$ ($1\leq i\leq N$).

6. The method according to claim 1, wherein the read operation comprises:

applying the first read voltage to the word line; and upon discharging sensing nodes coupled to the memory cells for the first read develop time, sensing data from the sensing nodes.

7. The method according to claim 1, further comprising:

performing second sensing operations on the memory cells based on a second read voltage and a second set of develop times; and selecting a second read develop time from the second set of develop times based on results of the second sensing operations, wherein the first sensing operations and the second sensing operations are performed during a first read cycle.

8. The method according to claim 7, wherein the read operation comprises:

applying the first read voltage to the word line;

upon discharging sensing node coupled to the memory cells for the first read develop time, sensing first data from the memory cells;

applying the second read voltage to the word line; and upon discharging the sensing node coupled to the memory cells for the second read develop time, sensing second data from the memory cells, wherein the read operation is performed during a second read cycle.

9. The method according to claim 7, wherein the method further comprises:

transmitting the first read develop time and the second read develop time to a user of the memory device.

10. A method for operating a memory device, the method comprising:

determining first groups of memory cells in memory cells of the memory device and a first set of develop times, wherein a develop time represents a discharging time duration in a sensing operation, and each group of memory cells of the first groups of memory cells is associated with a respective pair of develop times in the first set of develop times;

performing first sensing operations on each group of memory cells of the first groups of memory cells based on the respective pair of develop times associated with the group of memory cells, wherein the first sensing operations comprise a first set of discharging and sensing operations and a second set of discharging and sensing operations; and selecting one of the first set of develop times as a first read develop time based on results of the first sensing operations.

11. The method according to claim 10, wherein the method further comprises:

applying a first read voltage to a word line coupled to the memory cells;

pre-charging sensing nodes coupled to the memory cells;

upon discharging the sensing node coupled to the memory cells for a shortest develop time in the first set of develop times, determining first sensing results indicating whether a voltage at each of the sensing node coupled to the memory cells is higher than a predetermined threshold; and storing first sensing results in first latches.

12. The method according to claim 10, wherein:

the first groups of memory cells comprise N groups: group 1, group 2, . . . , group N, N being an integer;

the first set of develop times comprises N+1 develop times represented by $T_1, T_2, \ldots, T_{N+1}$ ($T_1<T_2< \ldots <T_{N+1}$);

the pair of develop times for group i comprises $T_i$ and $T_{i+1}$;

the first set of discharging and sensing operations on memory cells in group i ($1\leq i\leq N$) comprise:

upon discharging sensing node coupled to the memory cells in group i for $T_i$, determining second sensing results indicating whether a voltage at each of the sensing nodes coupled to the memory cells in group i is higher than the predetermined threshold; and storing second sensing results in second latches coupled to the memory cells in group i; and the second set of discharging and sensing operations on memory cells in group i (1≤i≤N) comprise:

pre-charging the sensing nodes coupled to the memory cells in group i;

upon discharging the sensing node coupled to the memory cells in group i for $T_{i+1}$, determining third sensing results indicating whether a voltage at each of the sensing nodes coupled to the memory cells in group i is lower than the predetermined threshold; and storing XOR results of the second sensing results and the third sensing results in third latches coupled to the memory cells in group i.

13. The method according to claim 12, wherein selecting the one of the first set of develop times as the first read develop time comprises:

determining a quantity of the third latches coupled to the memory cells in group i having a logical value of "1" Ci; and determining the first read develop time as develop time Tr upon determining that $C_j$ is the smallest number among $C_i$ (1≤i≤N).

14. The method according to claim 12, wherein $T_i = T_1 + (i-1) \times \Delta T$ (2≤i≤N+1), and wherein $\Delta T$ is a predetermined time period.

15. The method according to claim 12, wherein the memory cells are divided into the first groups of memory cells, the first latches are L latches, the second latches are sensing latches, and the third latches are first data latches.

16. The method according to claim 15, further comprising:

determining second groups of memory cells based on the first sensing results, wherein:

a subset of the memory cells is divided into the second groups of memory cells;

the subset of the memory cells is selected based on the first sensing results such that voltages at sensing node coupled to the subset of the memory cells are higher than the predetermined threshold; and each group of the second groups of memory cells is associated with a respective pair of develop times in a second set of develop times.

17. The method according to claim 16, further comprising:

applying a second read voltage to the word line;

pre-charging sensing nodes coupled to the second groups of memory cells;

performing second sensing operations on each group of the second groups of memory cells based on the respective pair of develop times in the second set of develop times; and selecting one of the second set of develop times as a second read develop time based on results of the second sensing operations.

18. The method according to claim 12, wherein a subset of the memory cells is divided into the groups of memory cells, the subset of the memory cells is selected based on the first sensing results such that voltages at sensing node coupled to the subset of the memory cells are higher than the predetermined threshold, and wherein the method further comprising:

upon storing the first sensing results in the first latches, pre-charging sensing nodes coupled to the memory cells in group i (1≤i≤N).

19. The method according to claim 18, further comprising:

applying a second read voltage to the word line;

pre-charging the sensing nodes coupled to the memory cells;

performing second sensing operations on each group of the first groups of memory cells based on a respective pair of develop times in a second set of develop times; and selecting one of the second set of develop times as a second read develop time based on results of the second sensing operations.

20. A memory device comprising:

a memory array comprising a word line and memory cells coupled to the word line; and a peripheral circuit comprising a control circuit and a page buffer, wherein the control circuit is configured to perform operations comprising:

determining first groups of memory cells in the memory cells and a first set of develop times, wherein a develop time represents a discharging time duration in a sensing operation, and each group of memory cells of the first groups of memory cells is associated with a respective pair of develop times in the first set of develop times;

performing first sensing operations on each group of memory cells of the first groups of memory cells based on the respective pair of develop times associated with the group of memory cells; and selecting one of the first set of develop times as a first read develop time based on results of the first sensing operations.

* * * * *